United States Patent
Iwata

(10) Patent No.: US 9,146,782 B2
(45) Date of Patent: Sep. 29, 2015

(54) PARALLEL COMPUTER SYSTEM, CONTROLLING METHOD FOR PARALLEL COMPUTER SYSTEM, AND STORAGE MEDIUM STORING CONTROLLING PROGRAM FOR MANAGEMENT APPARATUS

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/445,108

(22) Filed: Jul. 29, 2014

(65) Prior Publication Data
US 2015/0058860 A1    Feb. 26, 2015

(30) Foreign Application Priority Data
Aug. 22, 2013    (JP) .................. 2013-172716

(51) Int. Cl.
*G06F 9/46* (2006.01)
*G06F 9/50* (2006.01)

(52) U.S. Cl.
CPC ........ *G06F 9/5011* (2013.01); *G06F 2209/503* (2013.01)

(58) Field of Classification Search
None
See application file for complete search history.

(56) References Cited

U.S. PATENT DOCUMENTS

2009/0292787 A1    11/2009    Hosokawa

FOREIGN PATENT DOCUMENTS

| JP | 6-161990 | 6/1994 |
|---|---|---|
| JP | 2012-252591 | 12/2012 |
| WO | 2008-114440 | 9/2008 |

*Primary Examiner* — Gregory A Kessler
(74) *Attorney, Agent, or Firm* — Fujitsu Patent Center

(57) ABSTRACT

A node state storage unit stores therein information about a free state of each of the computation nodes. A search data storage unit has a data structure in which a state where the X-axis is crossed is developed into a virtual X-axis provided on the right end of the X-axis. By referring to the node state storage unit, a searching unit searches for the number of successive free nodes in the increasing directions of the X-axis including the virtual X-axis and the Y-axis, while using the computation node at each of the X-Y coordinate positions as a starting point, and writes a search result into the search data storage unit.

5 Claims, 34 Drawing Sheets

| T[0][0].yx[2]=12(8, 3) |
| T[1][0].yx[2]=12(7, 3) |
| T[2][0].yx[2]=12(6, 3) |
| T[3][0].yx[2]=12(5, 3) |
| ⋮ |
| ⋮ |
| T[7][0].yx[1]=2(1, 2) |
| T[7][1].yx[2]=2(1, 2) |
| T[7][0].yx[0]=1(1, 1) |
| T[7][1].yx[1]=1(1, 1) |
| T[7][2].yx[2]=1(1, 1) |

FIG.6

| NUMBER OF COMPU-TATION NODES | X SIZE | Y SIZE | SEARCHING PROCESS BY SEARCHING UNIT (MAIN PROCESS) | Y-FIXED SEARCHING PROCESS | X TORUS INVALID TOTAL | X TORUS VALID TOTAL |
|---|---|---|---|---|---|---|
| 24 | 24 | 1 | 27 | 996 | 1023 | 3771 |
| 48 | 24 | 2 | 53 | 2964 | 3017 | 11213 |
| 72 | 24 | 3 | 79 | 5904 | 5983 | 22327 |
| 96 | 24 | 4 | 105 | 9816 | 9921 | 37113 |
| 120 | 24 | 5 | 131 | 14700 | 14831 | 55571 |
| 144 | 24 | 6 | 157 | 20556 | 20713 | 77701 |
| 168 | 24 | 7 | 183 | 27384 | 27567 | 103503 |
| 192 | 24 | 8 | 209 | 35184 | 35393 | 132977 |
| 216 | 24 | 9 | 235 | 43956 | 44191 | 166123 |
| 240 | 24 | 10 | 261 | 53700 | 53961 | 202941 |
| 264 | 24 | 11 | 287 | 64416 | 64703 | 243431 |
| 288 | 24 | 12 | 313 | 76104 | 76417 | 287593 |
| 312 | 24 | 13 | 339 | 88764 | 89103 | 335427 |
| 336 | 24 | 14 | 365 | 102396 | 102761 | 386933 |
| 360 | 24 | 15 | 391 | 117000 | 117391 | 442111 |
| 384 | 24 | 16 | 417 | 132576 | 132993 | 500961 |
| 408 | 24 | 17 | 443 | 149124 | 149567 | 563483 |
| 432 | 24 | 18 | 469 | 166644 | 167113 | 629677 |

| |
|---|
| T[0][0][0].yzx[2][1]=24(8, 3, 2) |
| T[1][0][0].yzx[2][1]=24(7, 3, 2) |
| T[2][0][0].yzx[2][1]=24(6, 3, 2) |
| T[3][0][0].yzx[2][1]=24(5, 3, 2) |
| T[4][0][0].yzx[2][1]=24(4, 3, 2) |
| T[5][0][0].yzx[2][1]=18(3, 3, 2) |
| T[0][0][0].yzx[1][1]=16(8, 2, 2) |
| T[0][1][0].yzx[2][1]=16(8, 2, 2) |
| T[1][0][0].yzx[1][1]=16(7, 2, 2) |
| T[1][1][0].yzx[2][1]=16(7, 2, 2) |
| T[2][0][0].yzx[1][1]=16(6, 2, 2) |
| T[2][1][0].yzx[2][1]=16(6, 2, 2) |
| T[3][0][0].yzx[1][1]=16(5, 2, 2) |
| T[3][1][0].yzx[2][1]=16(5, 2, 2) |
| ⋮ |
| ⋮ |
| ⋮ |
| ⋮ |
| ⋮ |
| ⋮ |
| ⋮ |
| T[7][0][0].yzx[1][0]=2(1, 2, 1) |
| T[7][1][0].yzx[1][1]=2(1, 1, 2) |
| T[7][1][0].yzx[2][0]=2(1, 2, 1) |
| T[7][2][0].yzx[2][1]=2(1, 1, 2) |
| T[6][0][1].yzx[0][1]=2(2, 1, 1) |
| T[6][1][1].yzx[1][1]=2(2, 1, 1) |
| T[6][2][1].yzx[2][1]=2(2, 1, 1) |
| T[7][0][1].yzx[1][1]=2(1, 2, 1) |
| T[7][1][1].yzx[2][1]=2(1, 2, 1) |
| T[7][0][0].yzx[0][0]=1(1, 1, 1) |
| T[7][1][0].yzx[1][0]=1(1, 1, 1) |
| T[7][2][0].yzx[2][0]=1(1, 1, 1) |
| T[7][0][1].yzx[0][1]=1(1, 1, 1) |
| T[7][1][1].yzx[1][1]=1(1, 1, 1) |
| T[7][2][1].yzx[2][1]=1(1, 1, 1) |

```
union {
  uint64_t aa;
  uint8_t bb[8];
} cc;
cc.aa
```

FIG.16

```
static const char cbct[256]={
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0,
  1, 1, 1, 1, 1, 1, 1, 1, 1, 1, 1, 1, 1, 1, 1, 1,
  1, 1, 1, 1, 1, 1, 1, 1, 1, 1, 1, 1, 1, 1, 1, 1,
  1, 1, 1, 1, 1, 1, 1, 1, 1, 1, 1, 1, 1, 1, 1, 1,
  1, 1, 1, 1, 1, 1, 1, 1, 1, 1, 1, 1, 1, 1, 1, 1,
  2, 2, 2, 2, 2, 2, 2, 2, 2, 2, 2, 2, 2, 2, 2, 2,
  2, 2, 2, 2, 2, 2, 2, 2, 2, 2, 2, 2, 2, 2, 2, 2,
  3, 3, 3, 3, 3, 3, 3, 3, 3, 3, 3, 3, 3, 3, 3, 3,
  4, 4, 4, 4, 4, 4, 4, 4, 5, 5, 5, 5, 6, 6, 7, 8
```

FIG.24A

| | X=0 | X=1 | X=2 | X=3 |
|---|---|---|---|---|
| Y=2 | T[0][2].yx[2]=4(4, 1) | T[1][2].yx[2]=3(3, 1) | T[2][2].yx[2]=2(2, 1) | T[3][2].yx[2]=1(1, 1) |
| | T[0][2].yx[1]=0(0, 0) | T[1][2].yx[1]=0(0, 0) | T[2][2].yx[1]=0(0, 0) | T[3][2].yx[1]=0(0, 0) |
| | T[0][2].yx[0]=0(0, 0) | T[1][2].yx[0]=0(0, 0) | T[2][2].yx[0]=0(0, 0) | T[3][2].yx[0]=0(0, 0) |
| Y=1 | T[0][1].yx[2]=8(4, 2) | T[1][1].yx[2]=6(3, 2) | T[2][1].yx[2]=4(2, 2) | T[3][1].yx[2]=2(1, 2) |
| | T[0][1].yx[1]=4(4, 1) | T[1][1].yx[1]=3(3, 1) | T[2][1].yx[1]=2(2, 1) | T[3][1].yx[1]=1(1, 1) |
| | T[0][1].yx[0]=0(0, 0) | T[1][1].yx[0]=0(0, 0) | T[2][1].yx[0]=0(0, 0) | T[3][1].yx[0]=0(0, 0) |
| Y=0 | T[0][0].yx[2]=12(4, 3) | T[1][0].yx[2]=9(3, 3) | T[2][0].yx[2]=6(2, 3) | T[3][0].yx[2]=3(1, 3) |
| | T[0][0].yx[1]=8(4, 2) | T[1][0].yx[1]=6(3, 2) | T[2][0].yx[1]=4(2, 2) | T[3][0].yx[1]=2(1, 2) |
| | T[0][0].yx[0]=4(4, 1) | T[1][0].yx[0]=3(3, 1) | T[2][0].yx[0]=2(2, 1) | T[3][0].yx[0]=1(1, 1) |

☐ : COMPUTATION NODE

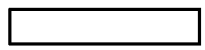 : INVALID DATA

 T[a][b].yx[c]=f(d, e) : SEARCH DATA OF SUCCESSIVE X SIZE (d) AND NUMBER OF SUCCESSIVE FREE NODES (f) OBTAINED WHILE SUCCESSIVE Y SIZE (e) IS FIXED (a=X-COORDINATE OF COMPUTATION NODE; b=Y-COORDINATE OF COMPUTATION NODE; c=ARRAY SUBSCRIPT)

FIG.24B

| |
|---|
| T[0][0].yx[2]=12(4, 3) |
| T[1][0].yx[2]=9(3, 3) |
| T[0][0].yx[1]=8(4, 2) |
| T[0][1].yx[2]=8(4, 2) |
| ⋮ |
| ⋮ |
| T[3][0].yx[1]=2(1, 2) |
| T[3][1].yx[2]=2(1, 2) |
| T[3][0].yx[0]=1(1, 1) |
| T[3][1].yx[1]=1(1, 1) |
| T[3][2].yx[2]=1(1, 1) |

FIG.29

| NUMBER OF COMPU-TATION NODES | X SIZE | Y SIZE | RECTANGLE SEARCHING PROCESS (MAIN PROCESS) | Y-FIXED SEARCHING PROCESS | X TORUS INVALID TOTAL | X TORUS VALID TOTAL |
|---|---|---|---|---|---|---|
| 24 | 24 | 1 | 27 | 972 | 999 | 23976 |
| 48 | 24 | 2 | 53 | 2892 | 2945 | 70680 |
| 72 | 24 | 3 | 79 | 5760 | 5839 | 140136 |
| 96 | 24 | 4 | 105 | 9576 | 9681 | 232344 |
| 120 | 24 | 5 | 131 | 14340 | 14471 | 347304 |
| 144 | 24 | 6 | 157 | 20052 | 20209 | 485016 |
| 168 | 24 | 7 | 183 | 26712 | 26895 | 645480 |
| 192 | 24 | 8 | 209 | 34320 | 34529 | 828696 |
| 216 | 24 | 9 | 235 | 42876 | 43111 | 1034664 |
| 240 | 24 | 10 | 261 | 52380 | 52641 | 1263384 |
| 264 | 24 | 11 | 287 | 62832 | 63119 | 1514856 |
| 288 | 24 | 12 | 313 | 74232 | 74545 | 1789080 |
| 312 | 24 | 13 | 339 | 86580 | 86919 | 2086056 |
| 336 | 24 | 14 | 365 | 99876 | 100241 | 2405784 |
| 360 | 24 | 15 | 391 | 114120 | 114511 | 2748264 |
| 384 | 24 | 16 | 417 | 129312 | 129729 | 3113496 |
| 408 | 24 | 17 | 443 | 145452 | 145895 | 3501480 |
| 432 | 24 | 18 | 469 | 162540 | 163009 | 3912216 |

PARALLEL COMPUTER SYSTEM, CONTROLLING METHOD FOR PARALLEL COMPUTER SYSTEM, AND STORAGE MEDIUM STORING CONTROLLING PROGRAM FOR MANAGEMENT APPARATUS

CROSS-REFERENCE TO RELATED APPLICATION(S)

This application is based upon and claims the benefit of priority of the prior Japanese Patent Application No. 2013-172716, filed on Aug. 22, 2013, the entire contents of which are incorporated herein by reference.

FIELD

The embodiments discussed herein are related to a parallel computer system, a controlling method for a parallel computer system, and a storage medium storing a controlling program for a management apparatus.

BACKGROUND

Conventionally, a parallel computer system is known in which computation nodes being in an adjacent relationship are connected together within a space of arbitrary dimensionality, by using a two-dimensional mesh connection, a three-dimensional cube connection, a torus connection, or the like, and in which communication between computation nodes that are not in an adjacent relationship is relayed by another computation node positioned on the path therebetween, where the torus connection is a mode of connection in which a plurality of computation nodes are connected together in a toric form.

In such a parallel computer system, when a job (hereinafter, "the first job") is allocated to computation nodes that are not in successively-arranged positions, the communication between the computation nodes to which the first job is allocated may be relayed by another computation node to which another job (hereinafter, "the second job") is allocated. In that situation, the communication between the computation nodes to which the first job is allocated may disturb the computation node to which the second job is allocated. Further, when an abnormality has occurred in any of the computation nodes executing the first job, the second job may be interrupted.

Thus, when allocating a new job, the parallel computer system searches, one by one in every region, for regions having successive free nodes to which no job is allocated and further selects an optimal region for executing the job from among the regions found in the search. After that, the parallel computer system allocates the new job to the selected region.

However, when allocating and freeing (when the execution of a job is finished) processes are repeatedly performed in units of rectangles or rectangular parallelepipeds containing successive computation nodes, more and more fragments occur over the course of time, and it becomes difficult to allocate large jobs (jobs that require a large number of computation nodes). FIG. 23A is a drawing of a situation where many fragments have occurred in a parallel computer system in which computation nodes are arranged two-dimensionally. In the example in FIG. 23A, because the positional arrangement of the four three-node jobs is not satisfactory, there are many fragments, and the largest free space, which is the largest rectangular space containing successive free computation nodes, has eight nodes.

To minimize occurrence of those situations, the parallel computer system can be configured to select computation nodes in such a manner that a large free space remains while smaller jobs (jobs that require a small number of computation nodes) are gathered to one or more sides. FIG. 23B is a drawing of a situation where computation nodes are selected in such a manner that a large free space remains while the smaller jobs are gathered to the side. In FIG. 23B, because the four three-node jobs are gathered to the side, the largest free space has eighteen nodes. Thus, the largest free space is larger than in the example illustrated in FIG. 23A where many fragments have occurred.

A two-dimensional torus connection is a mode of connection in which computation nodes positioned on two ends in the X direction and the Y direction in a two-dimensional mesh connection are connected to each other, the two-dimensional mesh connection being included in a two-dimensional torus connection. A three-dimensional torus connection is a mode of connection in which computation nodes positioned on two ends in the X direction, the Y direction, and the Z direction in a three-dimensional mesh connection are connected to each other, the three-dimensional mesh connection being included in a three-dimensional torus connection. In other words, a torus connection is a mode of connection in which elements are connected in a toric form via a connection end in a direction of a predetermined axis. Thus, considering that the connection is in such a mode where the two ends in a mesh connection included in a torus connection are connected to each other, the parallel computer system conducts a search by crossing the connection end represented by the two ends connected to each other in the mesh connection included in the torus connection. In the above description, an X direction refers to the direction of the X-axis, while a Y direction refers to the direction of the Y-axis, and a Z direction refers to the direction of the Z-axis. FIG. 23C is a drawing of an example of a largest free space positioned across the X-axis in a two-dimensional torus connection. In this example, as a result of searching for successive free computation nodes by crossing the X-axis, the largest free space has fifteen nodes.

In a parallel computer system in which connections are made with a two-dimensional torus connection network, to perform a process of searching for successive free computation nodes, search data having a data structure such as that illustrated in FIG. 24A is used. FIG. 24A is a drawing of search data about the number of successive free computation nodes toward the maximum X-Y coordinates for the computation node at each set of X-Y coordinates, in an example of a parallel computation system of which the X size is 4, whereas the Y size is 3, where the phrase "the X size is 4" means that four computation nodes are arranged in the X direction, whereas the phrase "the Y size is 3" means that that three computation nodes are arranged in the Y direction.

The data for each of the X-Y coordinate positions includes search data about a successive X size obtained by incrementing the successive Y size by 1 at a time from the pair of coordinates toward the Y=2 coordinates. In other words, the data for each of the X-Y coordinate positions includes search data $T[a][b].yx[c]=f(d,e)$ expressing a successive X size "d" and the number of successive free nodes "f" obtained while the successive Y size "e" is fixed, where "a" denotes the X-coordinate of the computation node, "b" denotes the Y-coordinate of the computation node, and c is an array subscript having a value from 0 to 2. The successive Y size is the size of successive free computation nodes in the Y direction, whereas the successive X size is the size of successive free computation nodes in the X direction. Further, all the values except for "f" and "d" are each a fixed value and are configured in initial setting. The values of "f" and "d" are each set to "0" in the initial setting. In FIG. 24A, the values of "f" and "d" found in the search are indicated in bold text.

For example, the data for the origin T[0][0] includes search data about the successive X size corresponding to when the successive Y size=1, 2, or 3 is satisfied. The data for T[3][2], which is the maximum X-Y coordinates, includes search data about the successive X size corresponding to when the successive Y size=1 is satisfied. FIG. 24A illustrates search data corresponding to the situation where all the computation nodes are in a free state. Further, the areas indicated with hatching in FIG. 24A represent pieces of invalid data. For example, if Y=1, the successive Y size "e" is either 1 or 2 and cannot be 3. Thus, the array subscript is either 1 or 2. If Y=2, because the successive Y size "e" can only be 1, the array subscript is only 1.

FIG. 24B is a drawing of a result obtained by sorting the search data illustrated in FIG. 24A according to the numbers of successive free computation nodes. It is possible to leave a large free space, i.e., a rectangle containing successive free computation nodes, by selecting the smallest rectangle containing successive free computation nodes that satisfies a shape and the number of computation nodes required by a user's job, from the sorted result illustrated in FIG. 24B.

It should be noted, however, that the data structure of the search data illustrated in FIG. 24A does not include any search data with X-axis crossing and Y-axis crossing. To process the X-axis crossing, because the computation node positioned on the right end is continuous with the computation node positioned on the left end, it is necessary to conduct a search by turning around from the right end to the left end, starting with each of the virtual origins, as illustrated in FIG. 25A. Similarly, to process the Y-axis crossing, because the computation node positioned on the upper end is continuous with the computation node positioned on the lower end, it is necessary to conduct a search by turning around from the upper end to the lower end, starting with each of the virtual origins, as illustrated in FIG. 25B.

FIG. 26 is a flowchart of a flow in a rectangle searching process for two-dimensional successive free computation nodes. As illustrated in FIG. 26, a searching unit configured to search for a rectangle in a parallel computer system initializes a variable Y to 0, the variable Y indicating the coordinate position of the computation node in the Y direction (step S201). After that, the searching unit judges whether Y is smaller than Ymax, which denotes the number of computation nodes arranged in the Y direction (step S202). If Y is not smaller than Ymax, because it means that the search has been conducted with respect to the Y direction while all the computation nodes are used as the search target, the process is ended.

On the contrary, if Y is smaller than Ymax, the searching unit initializes a variable X to 0, the variable X indicating the coordinate position of the computation node in the X direction (step S203). After that, the searching unit judges whether X is smaller than Xmax, which denotes the number of computation nodes arranged in the X direction (step S204). If X is smaller than Xmax, the searching unit performs a Y-fixed searching process (X,Y) with respect to the computation node at the coordinates (X,Y), to search for successive free computation nodes in the X direction while the successive Y size is fixed (step S205). After that, the searching unit increments X by 1 (step S206), and the process returns to step S204, so that the searching unit conducts a search by using the next computation node in the X direction as a starting point. On the contrary, if X is not smaller than Xmax, because it means that the search has been conducted with respect to the X direction while all the computation nodes are used as the search target, the searching unit increments Y by 1 (step S207), and the process returns to step S202.

FIG. 27 is a flowchart of a flow in the Y-fixed searching process (X,Y). As illustrated in FIG. 27, the searching unit initializes "XSize" to Xmax-X, "XSize" indicating the search size in the X direction. Further, the searching unit initializes an iteration variable "i" in the X direction to X, initializes an iteration variable "c" in the Y direction to Y, initializes the successive X size "d" to 0, and initializes the successive Y size "e" to 1 (step S211).

After that, the searching unit judges whether c is smaller than Ymax (step S212). If c is not smaller than Ymax, because it means that the search has been conducted with respect to all the successive Y sizes, the process is ended.

On the contrary, if c is smaller than Ymax, the searching unit judges whether i is smaller than Xmax (step S213). If i is smaller than Xmax, the searching unit judges whether i is smaller than XSize (step S214). If i is smaller than XSize, the searching unit judges whether T[i][c] indicates a free state, T[i][c] expressing whether the computation node at the coordinates (i,c) is free or not (step S215). If T[i][c] indicates a free state, the searching unit adds 1 to d and adds 1 to i (step S216). After that, the process returns to step S213, so that the searching unit checks the free state of the next computation node in the X direction.

On the contrary, if T[i][c] does not indicate a free state, if i is not smaller than XSize, or if i is not smaller than Xmax, because it means that the search for the successive X size has been finished, the searching unit calculates f by multiplying d by e. After that, the searching unit sets the values of f and d in the search data T[X][Y].yx[c], initializes XSize, i, and d to d, X, and 0, respectively, and further adds 1 to c and to e (step S217). The process then returns to step S212, and the searching unit conducts a search for the next successive Y size.

FIG. 28 is a drawing for explaining an outline of a process in a Y-fixed searching process (0,0). As illustrated in FIG. 28, to search for a successive X size corresponding to when the successive Y size is 1, the searching unit initializes XSize (1), judges whether i is smaller than XSize (2), and judges whether the computation node is free or not (3). After that, the searching unit repeatedly performs judging processes (4), (6), and (8) to judge whether i is smaller than XSize and judging processes (5), (7), and (9) to judge whether the computation node is free, until either i is no longer smaller than XSize or the computation node is no longer free.

After that, to search for a successive X size corresponding to when the successive Y size is 2, the searching unit initializes XSize to the successive X size corresponding to when the successive Y size is 1 (10). The reason why the searching unit initializes XSize to the successive X size corresponding to when the successive Y size is 1 is that there is no possibility that the successive X size corresponding to when the successive Y size is 2 is larger than the successive X size corresponding to when the successive Y size is 1. After that, the searching unit repeatedly performs judging processes (11), (13), (15), and (17) to judge whether i is smaller than XSize and judging processes (12), (14), (16), and (18) to judge whether the computation node is free, until either i is no longer smaller than XSize or the computation node is no longer free.

After that, to search for a successive X size corresponding to when the successive Y size is 3, the searching unit initializes XSize to the successive X size corresponding to when the successive Y size is 2 (19). After that, the searching unit repeatedly performs judging processes (20), (22), (24), and (26) to judge whether i is smaller than XSize and judging processes (21), (23), (25), and (27) to judge whether the computation node is free, until either i is no longer smaller than XSize or the computation node is no longer free.

Incidentally, a conventional technique is known by which processes are automatically arranged in optimal positions in order to shorten the time period required by the execution of parallel programs, in a PC cluster system having a three-dimensional torus connection structure (see, for example, Patent Document 1). Further, another conventional technique is also known by which one-to-many or many-to-many communication is efficiently performed in a parallel computer system configured with a torus connection network (see, for example, Patent Document 2). Furthermore, yet another conventional technique is also known by which a plurality of rectangles having mutually-different shapes are efficiently arranged, while ensuring that no rules are violated, into a rectangular region serving as a positioning region (see, for example, Patent Document 3).

CITATION LIST

Patent Literature

Patent Document 1: Japanese Laid-open Patent Publication No. 2012-252591
Patent Document 2: International Publication Pamphlet No. WO 2008/114440
Patent Document 3: Japanese Laid-open Patent Publication No. 06-161990

However, the conventional searching process has a problem where when there are a large number of computation nodes, the processing takes a long time, and it may not be possible to complete the computation node selecting process within a practical period of time. During the searching process, the condition judging processes in the loop account for a large part of the entire processing, as illustrated in the flowcharts in FIGS. 26 and 27. Accordingly, it is possible to determine whether the processing time increases or decreases by judging the number of times the condition judging process is performed.

FIGS. 29 and 30 are drawings for explaining an increase in the number of times the condition judging process is performed, the increase being caused by an increase in the number of computation nodes. FIG. 29 is a table illustrating the increase in the number of times the condition judging process is performed caused by an increase in the number of computation nodes. FIG. 30 is a chart illustrating the increase in the number of times the condition judging process is performed caused by the increase in the number of computation nodes. FIGS. 29 and 30 each illustrate the number of times the condition judging process is performed when the X size is 24, while the Y size increases from 1 to 18.

As illustrated in FIG. 29, the X torus invalid total indicating the number of times the condition judging process is performed while the X torus connection is invalid changes from 999 to 163,009 (163 times as large) when the number of computation nodes changes from 24 to 432 (18 times as large). Further, the X torus valid total indicating the number of times the condition judging process is performed while the X torus connection is valid changes from 999 to 3,912,216 (3,916 times as large) when the number of computation nodes changes from 24 to 432 (18 times as large) and the X-axis crossing is valid. In FIG. 30, the chart of the Y-fixed searching process overlaps the chart of the X torus invalid total.

SUMMARY

According to an aspect of an embodiment, a parallel computer system includes: a parallel computer including a predetermined number of information processing apparatuses that are connected together in a toric form via connection ends in a direction of a predetermined axis; and a management apparatus that manages the parallel computer, wherein the management apparatus includes: a search data storage unit that stores therein, for each of the information processing apparatuses used as a starting point, search data about a successive-free-apparatus number indicating how many information processing apparatuses are found in a search to be successively in a free state with respect to each of directions of all axes from the starting-point information processing apparatus, the search being conducted in twice as many information processing apparatuses as the predetermined number by crossing the connection ends positioned in the direction of the predetermined axis; a searching unit that, by using the search data stored in the search data storage unit, searches for the successive-free-apparatus number while including situations where the connection ends are crossed in the direction of the predetermined axis; and an allocating unit that allocates two or more of the information processing apparatuses to an allocation target job, on a basis of the successive-free-apparatus number found in the search by the searching unit.

According to another aspect of an embodiment, a parallel computer system includes: a parallel computer including a predetermined number of information processing apparatuses that are connected together in a toric form via connection ends in a direction of a predetermined axis; and a management apparatus that manages the parallel computer, wherein the management apparatus includes: a hierarchical data storage unit that stores therein hierarchical data obtained by developing block data for each of numbers indicating how many information processing apparatuses are successively in a free state in each of directions of axes except for the predetermined axis, the block data indicating, for each of the information processing apparatuses used as a starting point, information about whether a certain number of information processing apparatuses are successively in the free state in each of the directions of the axes except for the predetermined axis from the starting-point information processing apparatus; a search data storage unit that stores therein, for each of the information processing apparatuses used as the starting point, search data about a successive-free-information-processing-apparatus number indicating how many information processing apparatuses are found in a search to be successively in the free state in each of the directions of all the axes from the starting-point information processing apparatus; a searching unit that, by using the search data stored in the search data storage unit and the hierarchical data stored in the hierarchical data storage unit, searches for the successive-free-information-processing-apparatus number with respect to each of the information processing apparatuses; and an allocating unit that allocates two or more of the information processing apparatuses to an allocation target job, on a basis of the successive-free-information-processing-apparatus number found in the search by the searching unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a drawing of an exemplary data structure of a search data storage unit;

FIG. 3 is a drawing of an exemplary data structure of a sorted result storage unit;

FIG. 6 is a table illustrating the number of times the searching unit performs a condition judging process according to the first embodiment;

FIG. 10B is another drawing of the hierarchical data structure of the hierarchical data storage unit;

FIG. 10C is yet another drawing of the hierarchical data structure of the hierarchical data storage unit;

FIG. 10D is yet another drawing of the hierarchical data structure of the hierarchical data storage unit;

FIG. 11 is a drawing of an exemplary data structure of a search data storage unit;

FIG. 12 is a drawing of a sorted result obtained from the search data illustrated in FIG. 11;

FIG. 16 is a drawing of a bit number table;

FIG. 24A is a drawing of a representation example of rectangle search data about two-dimensional successive free computation nodes;

FIG. 24B is a drawing of a sorted result obtained from the search data illustrated in FIG. 24A;

FIG. 29 is a drawing for explaining an increase in the number of times a condition judging process is performed, the increase being caused by an increase in the number of computation nodes.

DESCRIPTION OF EMBODIMENTS

Preferred embodiments of the present invention will be explained with reference to accompanying drawings. The present disclosure is not limited by these embodiments.

[a] First Embodiment

Figure 1:
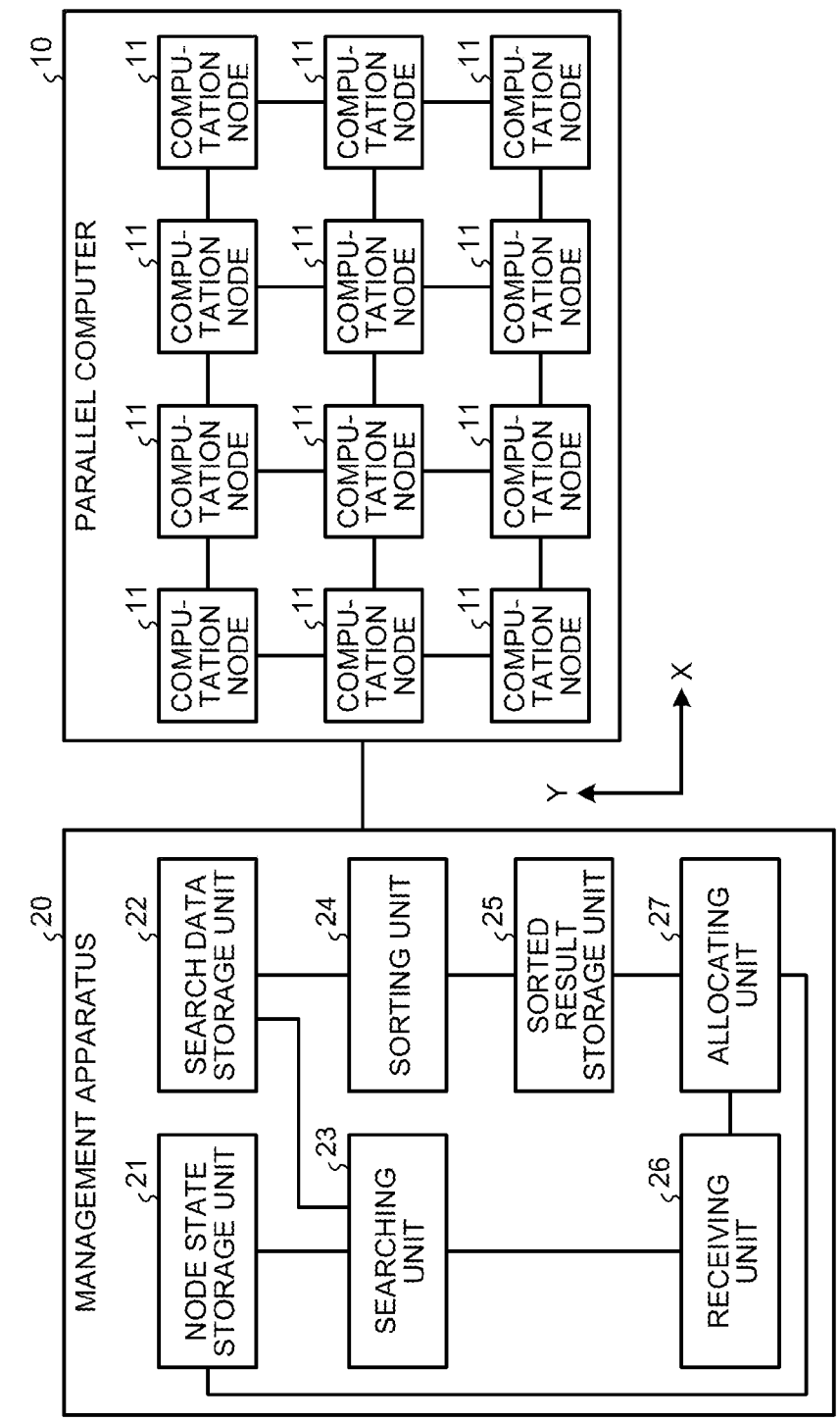
FIG. 1 is a diagram of a configuration of a parallel computer system according to a first embodiment.

First, a configuration of a parallel computer system according to a first embodiment will be explained. FIG. 1 is a diagram of a configuration of the parallel computer system according to the first embodiment. As illustrated in FIG. 1, a parallel computer system 1 includes a parallel computer 10 and a management apparatus 20.

In the parallel computer 10, four computation nodes 11 are arranged in the X direction, and three computation nodes 11 are arranged in the Y direction. Accordingly, the parallel computer 10 includes twelve computation nodes 11 in total. Each of the computation nodes 11 is configured by using an information processing apparatus that includes a Central Processing Unit (CPU), a memory, a communicating unit, and the like.

Each of the computation nodes 11 is directly connected to the computation nodes 11 that are positioned adjacent thereto in the up, down, right, and left directions. Further, the parallel computer 10 is realized with a torus connection in the X direction, so that the computation nodes 11 positioned on the left end are directly connected to the computation nodes positioned on the right end. In the present example, only the twelve computation nodes 11 are illustrated for the sake of convenience in the explanation; however, the parallel computer 10 may include any arbitrary number of computation nodes 11.

The management apparatus 20 is an apparatus configured to manage the parallel computer 10 and, for example, to allocate a job to the computation nodes 11. The management apparatus 20 includes a node state storage unit 21, a search data storage unit 22, a searching unit 23, a sorting unit 24, a sorted result storage unit 25, a receiving unit 26, and an allocating unit 27.

The node state storage unit 21 is configured to store therein information indicating whether each of the computation nodes 11 is free or in use. The node state storage unit 21 stores therein a piece of 1-bit information in correspondence with X-Y coordinates of each of the computation nodes 11. The piece of 1-bit information is arranged so that "1" indicates that the computation node 11 is free, whereas "0" indicates that the computation node 11 is in use.

Figure 2:
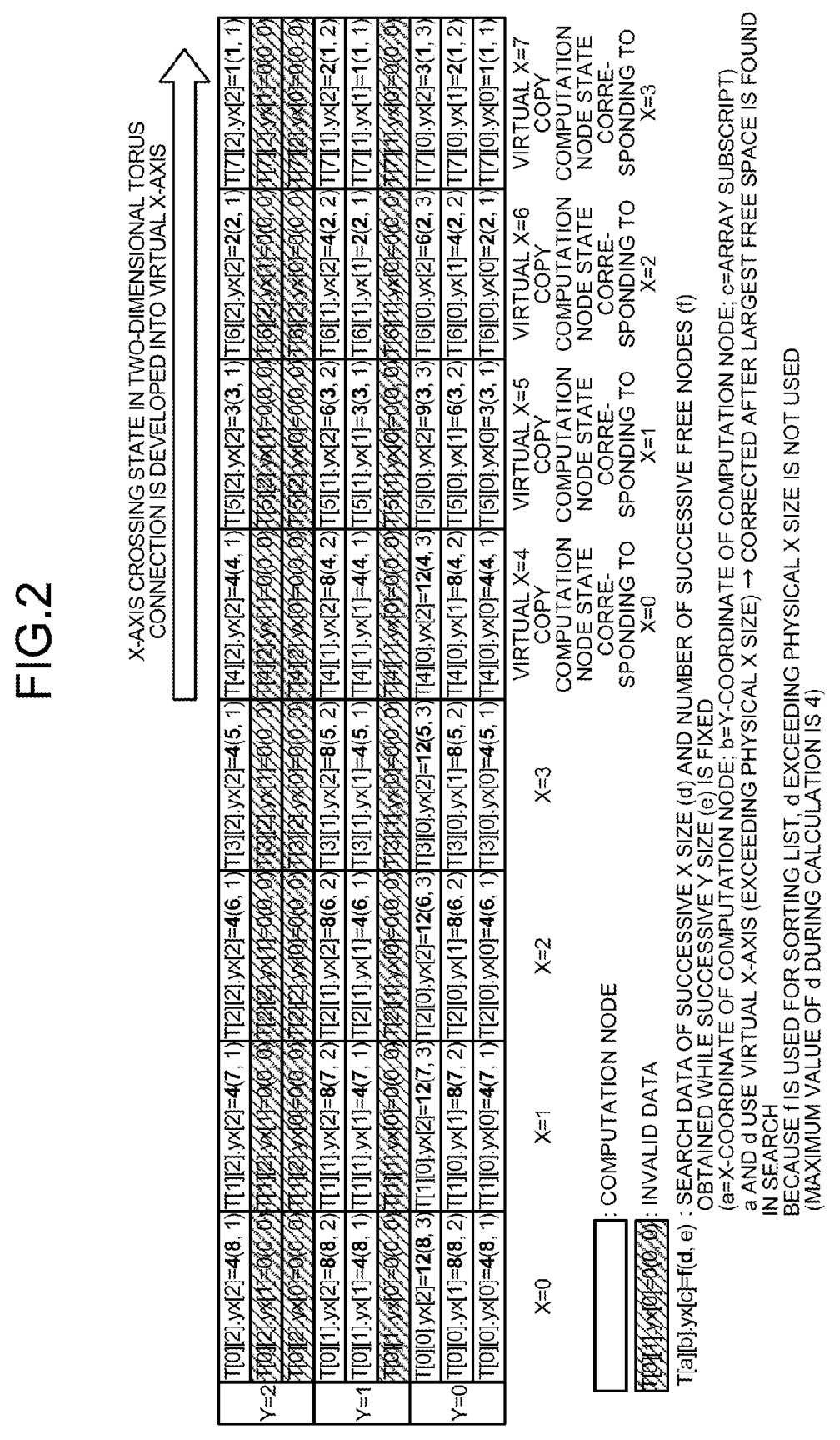

The search data storage unit 22 is configured to store therein search data about successive free nodes, which are computation nodes 11 that are successively in a free state. FIG. 2 is a drawing of an exemplary data structure of the search data storage unit 22. FIG. 2 illustrates search data about the number of successive free nodes aligned toward the maximum X-Y coordinates, for each of the computation nodes at a pair of X-Y coordinates.

The data for each of the X-Y coordinate positions includes search data about a successive X size that is obtained by incrementing the successive Y size by 1 at a time from the pair of coordinates toward the Y=2 coordinates. In other words, the data for each of the X-Y coordinate positions includes search data T[a][b].yx[c]=f(d,e) about a successive X size "d" and the number of successive free nodes "f" obtained while the successive Y size "e" is fixed, where "a" denotes the X-coordinate of the computation node 11, "b" denotes the Y-coordinate of the computation node 11, and "c" is an array subscript having a value from 0 to 2. Further, all the values except for "d" and "f" are each a fixed value and are configured in initial setting. The values of "f" and "d" are each set to "0" in the initial setting. In FIG. 2, the values of "f" and "d" found in the search are indicated in bold text.

It should be noted that, however, unlike the search data illustrated in FIG. 24A, the search data storage unit 22 has a data structure in which the state where the X-axis is crossed is developed into a virtual X-axis provided on the right end of the X-axis. The data on the virtual X-axis copies the state of the data on the actual X-axis. For example, virtual X=4 represents a copy of the state of the computation node at X=0. Accordingly, for the four computation nodes 11 arranged in the X direction, the search data storage unit 22 stores therein the search data corresponding to eight computation nodes in the X direction, which is twice as many as four, in order to accommodate the X-axis crossing.

FIG. 2 illustrates the search data corresponding to the situation where all the computation nodes 11 are in a free state. Further, the areas indicated with hatching in FIG. 2 represent pieces of invalid data. For example, if Y=1, the successive Y size "e" is either 1 or 2 and cannot be 3. Thus, the array subscript is either 1 or 2. If Y=2, because the successive Y size "e" can only be 1, the array subscript is only 1.

The searching unit 23 is configured to search for the number of successive free nodes by using the node state storage unit 21, in the increasing directions of the X-axis including the virtual X-axis and the Y-axis, while using the computation node 11 at each of the X-Y coordinate positions as a starting point and is configured to write a search result into the search data storage unit 22. The searching unit 23 conducts the search while the maximum value of the successive X size is set to 8 including the virtual X-axis. However, the searching unit 23 calculates the number of successive free computation nodes so as not to exceed the actual X size.

The sorting unit 24 is configured to sort the search data stored in the search data storage unit 22 according to the numbers of successive free nodes and to write a sorted result into the sorted result storage unit 25. The sorted result storage unit 25 is configured to store therein the sorted result obtained by the sorting unit 24. FIG. 3 is a drawing of an exemplary data structure of the sorted result storage unit 25. As illustrated in FIG. 3, the sorted result storage unit 25 is configured to store therein the search data sorted according to the numbers of successive free nodes.

The receiving unit 26 is configured to receive a job specified by a user with the use of an input device and to instruct the searching unit 23 to search for successive free nodes. Further, the receiving unit 26 is configured to instruct the allocating unit 27 to allocate computation nodes 11 to the job received from the user.

The allocating unit 27 is configured to select the computation nodes 11 to which a job is to be allocated on the basis of the numbers of successive free nodes stored in the sorted result storage unit 25. In other words, the allocating unit 27 selects the smallest rectangle containing free computation nodes 11 that satisfies the shape and the number of computation nodes required by the user's job. As a result of the allocating unit 27 selecting the smallest rectangle containing the free computation nodes 11 that satisfies the shape and the number of computation nodes required by the user's job, the management apparatus 20 is able to leave a large free space.

Further, the allocating unit 27 is configured to instruct the selected computation nodes 11 to execute the job. Further, the allocating unit 27 is configured to update the node state storage unit 21 with regard to the computation nodes 11 to which the job was allocated. Further, the allocating unit 27 is configured to update the node state storage unit 21 with regard to the computation nodes 11 that completed the job.

Figure 4:
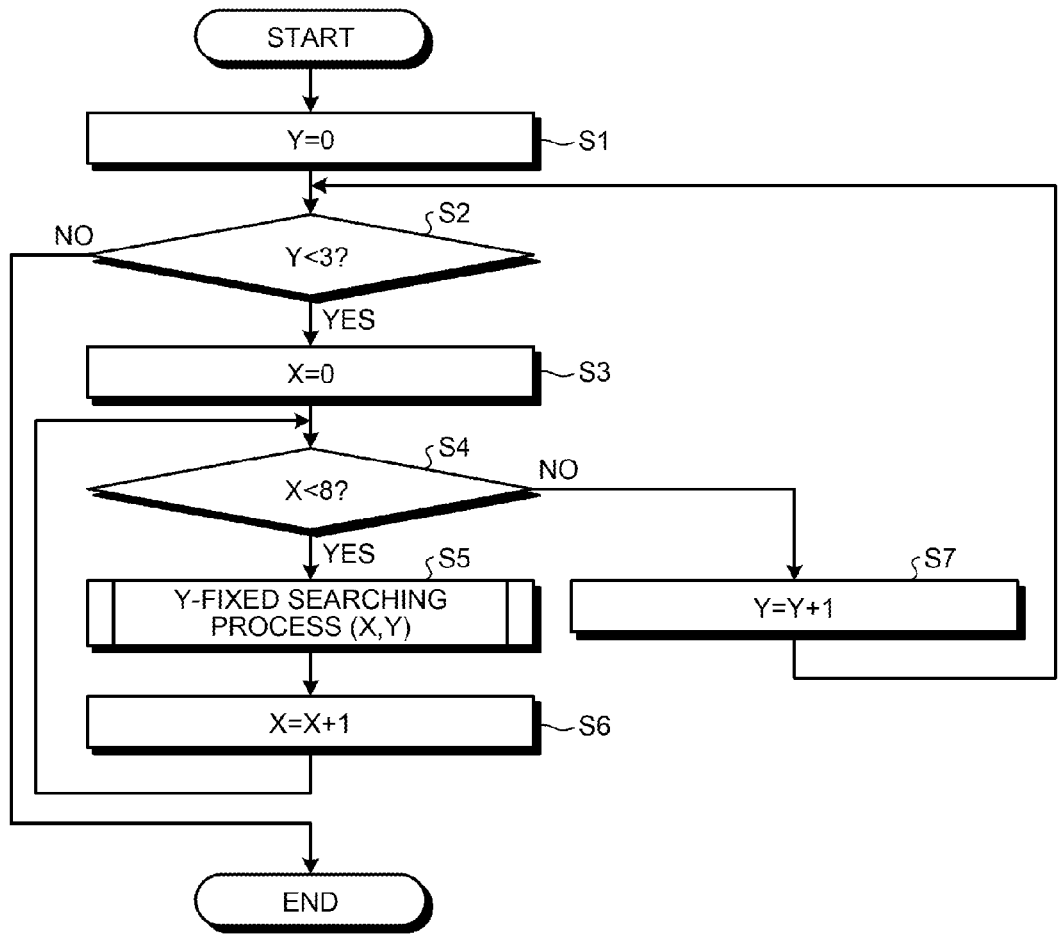
FIG. 4 is a flowchart of a flow in a searching process performed by a searching unit.

Next, a flow in a searching process performed by the searching unit 23 will be explained. FIG. 4 is a flowchart of the flow in the searching process performed by the searching unit 23. As illustrated in FIG. 4, the searching unit 23 initializes a variable Y to 0, the variable Y indicating the coordinate position of the computation node 11 in the Y direction (step S1). After that, the searching unit 23 judges whether Y is smaller than 3, which is the number of computation nodes 11 arranged in the Y direction (step S2). If Y is not smaller than 3, because it means that the search has been conducted with respect to the Y direction while all the computation nodes 11 are used as the search target, the process is ended.

On the contrary, if Y is smaller than 3, the searching unit 23 initializes a variable X to 0, the variable X indicating the coordinate position of the computation node 11 in the X direction (step S3). After that, the searching unit 23 judges whether X is smaller than 8, which is the number of computation nodes 11 arranged in the X direction including the virtual X-axis (step S4). If X is smaller than 8, the searching unit 23 performs a Y-fixed searching process (X,Y) with respect to the computation node 11 at the coordinates (X,Y), to search for successive free nodes in the X direction while the successive Y size is fixed (step S5).

Subsequently, the searching unit 23 increments X by 1 (step S6), and the process returns to step S4, so that the searching unit 23 performs a Y-fixed searching process (X,Y) by using the next computation node 11 in the X direction, as a starting point. On the contrary, if X is not smaller than 8, because it means that the search has been conducted with respect to the X direction while all the computation nodes 11 are used as the search target, the searching unit 23 increments Y by 1 (step S7). The process then returns to step S2, and the searching unit 23 performs a Y-fixed searching process (X,Y) by using the next computation node 11 in the Y direction, as a starting point.

Figure 5:
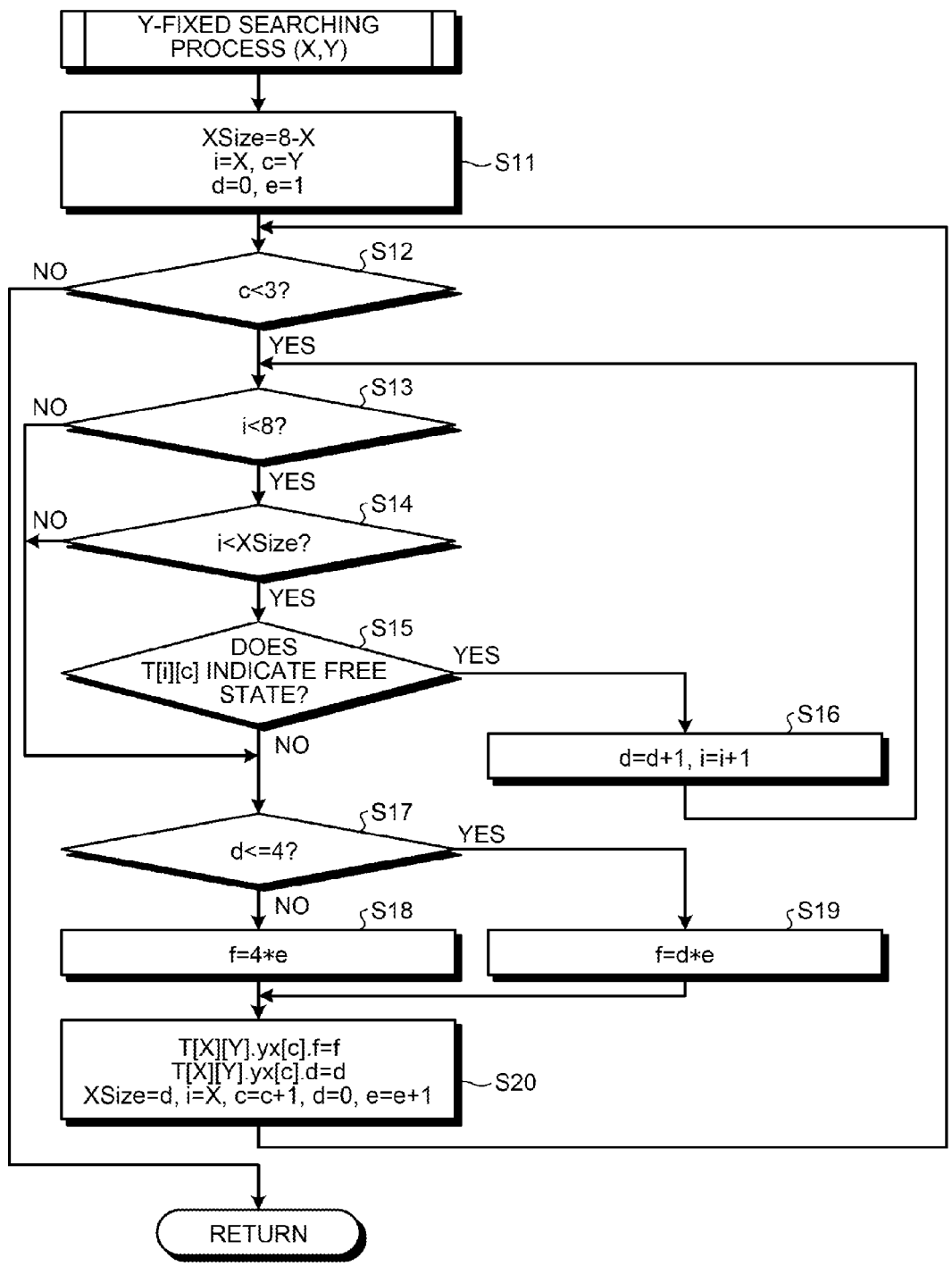
FIG. 5 is a flowchart of a flow in a Y-fixed searching process (X,Y)

FIG. 5 is a flowchart of a flow in the Y-fixed searching process (X,Y). As illustrated in FIG. 5, the searching unit 23 initializes XSize to 8-X, XSize being the search size in the X direction. Further, the searching unit 23 initializes an iteration variable "i" in the X direction to X, initializes an iteration variable "c" in the Y direction to Y, initializes the successive X size "d" to 0, and initializes the successive Y size "e" to 1 (step S11).

After that, the searching unit 23 judges whether c is smaller than 3 (step S12). If c is not smaller than 3, because it means that the search has been conducted with respect to all the successive Y sizes, the process is ended.

On the contrary, if c is smaller than 3, the searching unit 23 judges whether i is smaller than 8 (step S13). If i is smaller than 8, the searching unit 23 judges whether i is smaller than XSize (step S14). If i is smaller than XSize, the searching unit 23 judges whether T[i][c] indicates a free state, T[i][c] expressing whether the computation node 11 at the coordinates (i,c) is free or not (step S15). T[i][c] is the information stored in the node state storage unit 21. If T[i][c] indicates a free state, the searching unit 23 adds 1 to d and adds 1 to i (step S16). After that, the process returns to step S13, so that the searching unit 23 checks the free state of the next computation node 11.

On the contrary, if T[i][c] does not indicate a free state, if i is not smaller than XSize, or if i is not smaller than 8, because it means that the search for the successive X size has been finished, the searching unit 23 judges whether d is equal to or smaller than 4 (step S17). If d is not equal to or smaller than 4, because it means that the X-axis is crossed, the searching unit 23 calculates f by multiplying 4 by e (step S18). If d is equal to or smaller than 4, because it means that the X-axis is not crossed, the searching unit 23 calculates f by multiplying d by e (step S19).

After that, the searching unit 23 sets the values of f and d in the search data T[X][Y].yx[c], initializes XSize, i, and d to d, X, and 0, respectively, and further adds 1 to c and to e (step S20). Subsequently, the process returns to step S12, so that the searching unit 23 conducts a search for the next successive Y size.

As explained above, when the search for the successive X size has been finished, the searching unit 23 judges whether the X-axis is crossed in the current situation. If the X-axis is crossed, the searching unit 23 calculates the number of successive free nodes so as not to exceed the actual X size. Consequently, the searching unit 23 is able to correctly calculate the number of successive free nodes.

Figure 7:
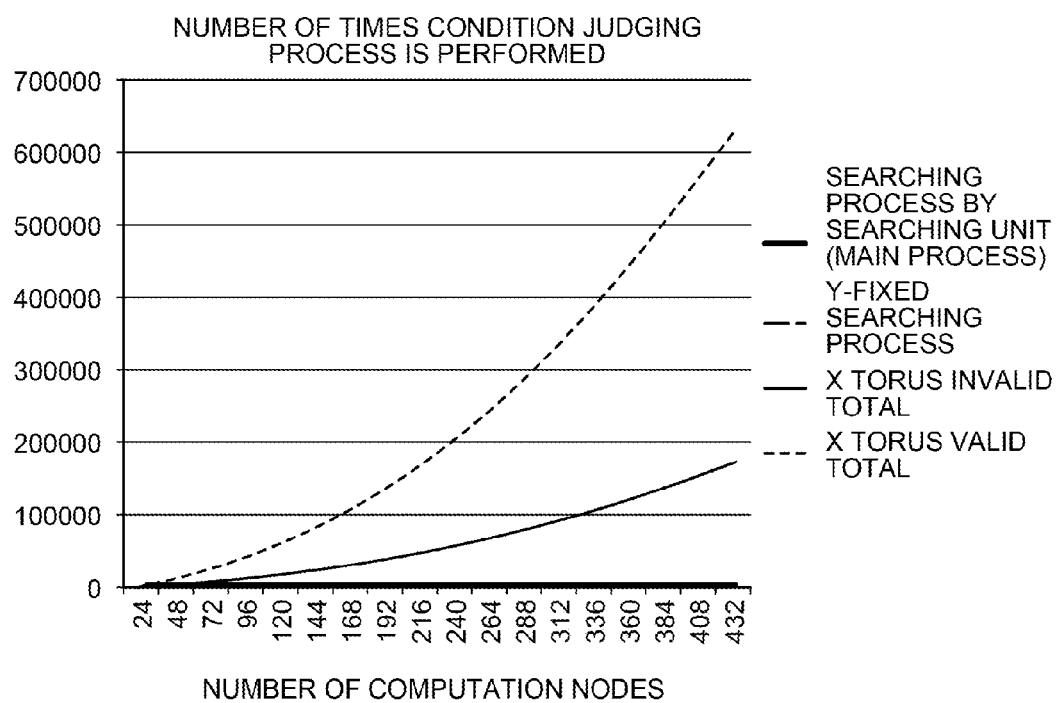
FIG. 7 is a chart illustrating the number of times the searching unit performs the condition judging process according to the first embodiment.

FIGS. 6 and 7 illustrate the number of times the searching unit 23 performs a condition judging process according to the first embodiment. FIG. 6 is a table illustrating the number of times the searching unit 23 performs the condition judging process according to the first embodiment. FIG. 7 is a chart illustrating the number of times the searching unit 23 performs the condition judging process according to the first embodiment. FIGS. 6 and 7 each illustrate the number of times the condition judging process is performed, when the X size is 24, while the Y size increases from 1 to 18.

As illustrated in FIG. 6, the X torus valid total indicating the number of times the condition judging process is performed while the X torus connection is valid is 629,677 when the number of computation nodes is 432. Thus, the X torus valid total is one-sixth of that in the conventional example, which is 3,912,216. In FIG. 7, the chart of the Y-fixed searching process overlaps the chart of the X torus invalid total.

As explained above, in the first embodiment, the node state storage unit 21 stores therein the information about the free state of each of the computation nodes 11. Further, the search data storage unit 22 has the data structure in which the state where the X-axis is crossed is developed into the virtual X-axis provided on the right end of the X-axis. Further, by referring to the node state storage unit 21, the searching unit 23 searches for the number of successive free nodes in the increasing directions of the X-axis including the virtual X-axis and the Y-axis while using the computation node 11 at each of the X-Y coordinate positions as the starting point and writes the search result into the search data storage unit 22. Consequently, the management apparatus 20 is able to reduce the number of times the condition judging process is performed compared to the example in which the number of successive free nodes is searched for by crossing the X-axis while moving the virtual origin. The management apparatus 20 is thus able to shorten the time period required by the process of searching for the number of successive free nodes.

The first embodiment is explained above with the example in which the search is conducted by crossing the axis in the X direction. However, the present disclosure is not limited to this example. The present disclosure is similarly applicable to a situation where a search is conducted by crossing the axis in the Y direction and to a situation where a search is conducted by crossing the axes in the directions of both the X-axis and the Y-axis.

Further, the first embodiment is explained above with the example in which the computation nodes 11 are arranged two-dimensionally. However, the present disclosure is not limited to this example. The present disclosure is similarly applicable to situations where the computation nodes 11 are arranged in arbitrary dimensionality such as, for example, a situation where the computation nodes 11 are arranged three-dimensionally.

[b] Second Embodiment

The first embodiment described above is able to reduce the number of times the condition judging process is performed during the process of searching for the number of successive free nodes by crossing the axis. However, because the data amount in the X direction is doubled, the number of times the condition judging process is performed increases when searching for the successive free nodes in the X direction. To cope with this situation, in a second embodiment, a parallel computer system will be explained by which the number of times a condition judging process is performed is reduced in the process of searching for a rectangle/rectangular parallelepiped containing successive free computation nodes 11.

Figure 8:
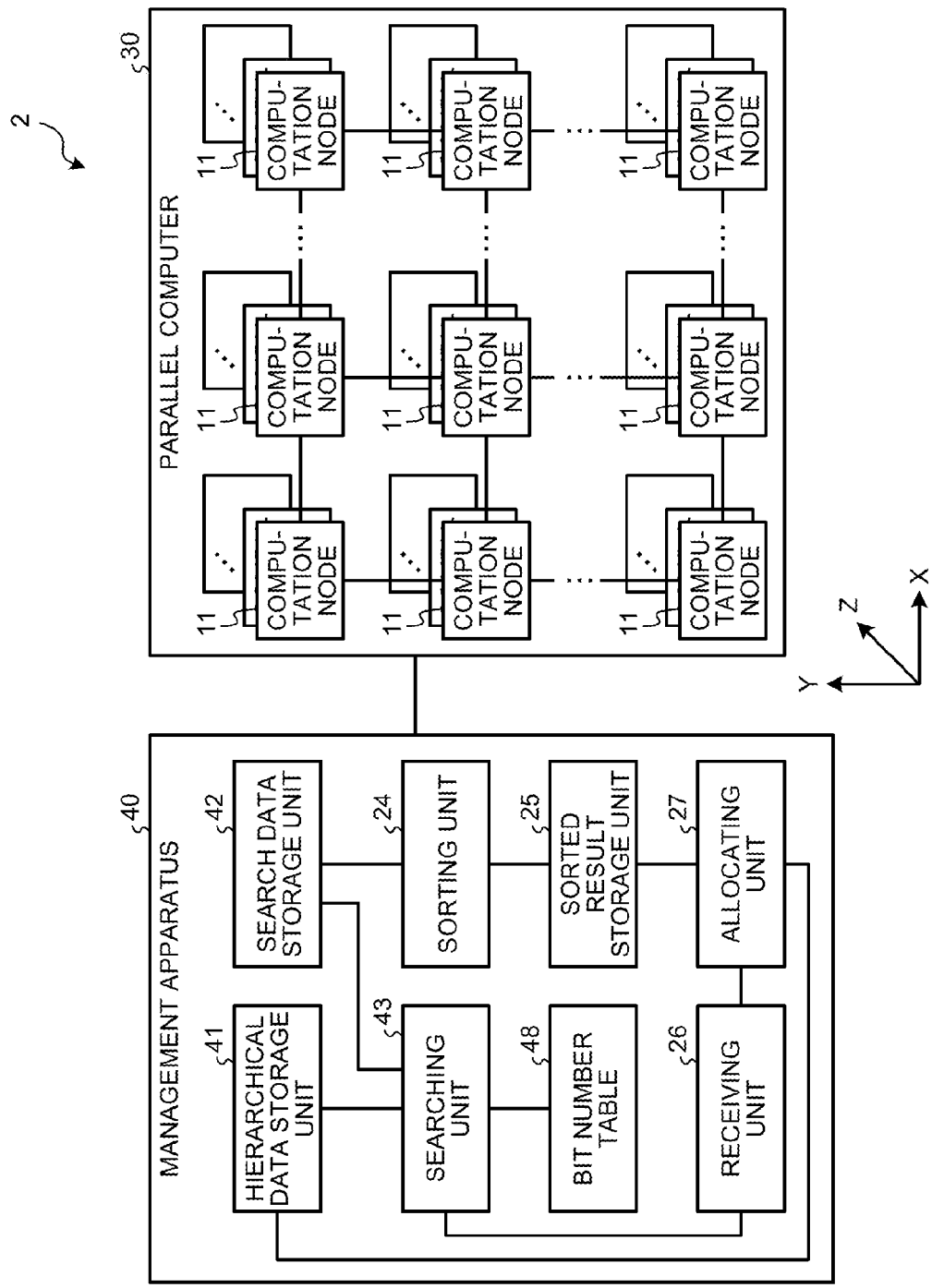
FIG. 8 is a diagram of a configuration of a parallel computer system according to a second embodiment.

First, a configuration of a parallel computer system according to the second embodiment will be explained. FIG. 8 is a diagram of the configuration of the parallel computer system according to the second embodiment. For the sake of convenience in the explanation, some of the functional elements that assume the same roles as those illustrated in FIG. 1 will be referred to by using the same reference characters, and the detailed explanation thereof will be omitted. As illustrated in FIG. 8, the parallel computer system 2 includes a parallel computer 30 and a management apparatus 40.

In the parallel computer 30, six computation nodes 11 are arranged in the X direction, five computation nodes 11 are arranged in the Y direction, and four computation nodes 11 are arranged in the Z direction. Accordingly, the parallel computer 30 includes 120 computation nodes 11 in total. Each of the computation nodes 11 is configured by using an information processing apparatus that includes a CPU, a memory, a communicating unit, and the like.

Each of the computation nodes 11 is directly connected to the computation nodes 11 that are positioned adjacent thereto in the mutually-different directions. Further, the parallel computer 30 is realized with a torus connection in the X direction, so that the computation nodes 11 positioned on the left end are directly connected to the computation nodes 11 positioned on the right end. In the present example, the 120 computation nodes 11 are illustrated for the sake of convenience in the explanation; however, the parallel computer 30 may include any arbitrary number of computation nodes 11.

The management apparatus 40 is an apparatus configured to manage the parallel computer 30 and, for example, to allocate a job to the computation nodes 11. The management apparatus 40 includes a hierarchical data storage unit 41, a search data storage unit 42, a searching unit 43, the sorting unit 24, the sorted result storage unit 25, the receiving unit 26, the allocating unit 27, and a bit number table 48.

Figure 9:
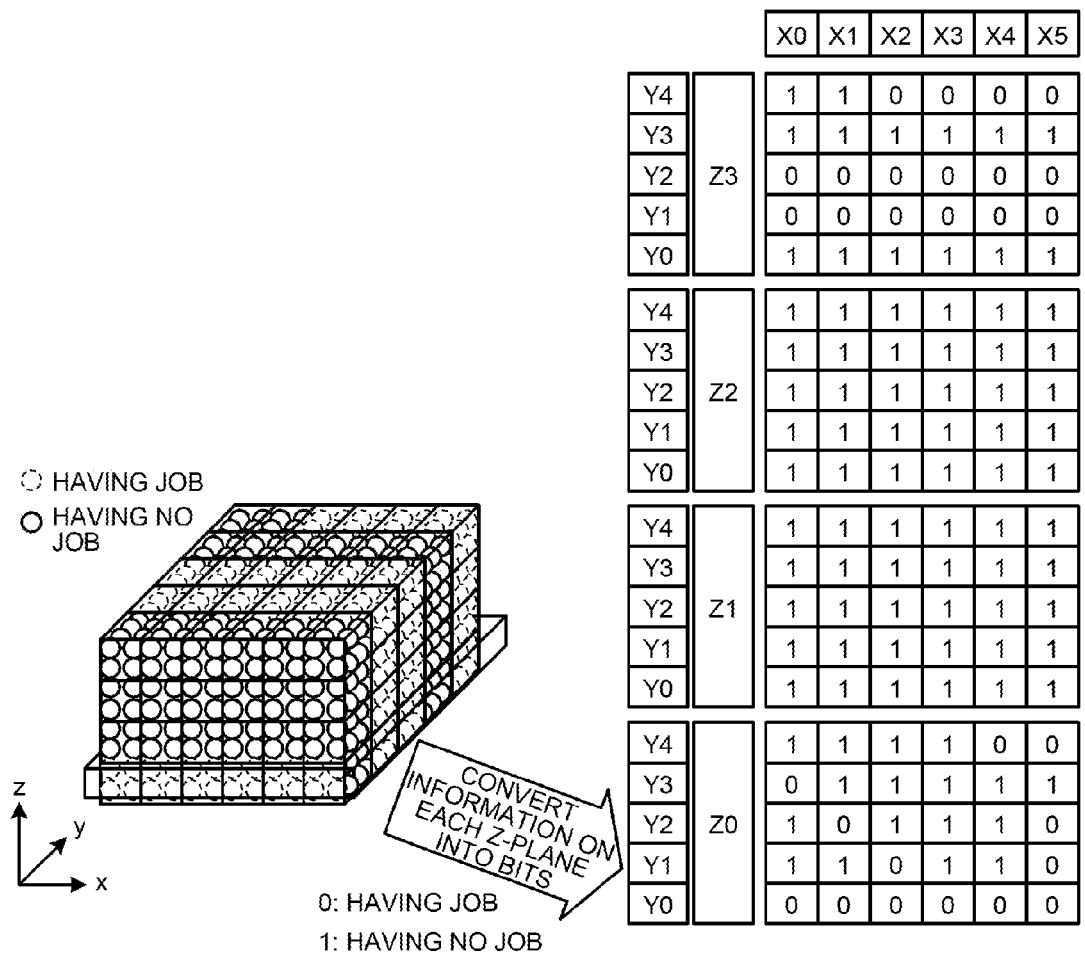
FIG. 9 is a drawing of a bit conversion process performed on a state of each of computation nodes in a parallel computer system.

The hierarchical data storage unit 41 is configured to store therein data that has a hierarchical data structure and indicates the number of successive free nodes in the Z direction and the Y direction. Next, a bit conversion process performed on the state of each of the computation nodes that is necessary for explaining the hierarchical data structure will be explained. FIG. 9 is a drawing of the bit conversion process performed on the state of each of the computation nodes in the parallel computer system 2. In FIG. 9, X0 to X5 indicate that the X-coordinate has a value from 0 to 5, whereas Y0 to Y4 indicate that the Y-coordinate has a value from 0 to 4, and Z0 to Z3 indicate that the Z-coordinate has a value from 0 to 3.

As illustrated in FIG. 9, the state of each of the computation nodes 11 is expressed by using one bit in a position corresponding to the X-Y coordinates on each of the planes Z0, Z1, Z2, and Z3. In FIG. 9, "1" indicates having no job, i.e., the computation node state is "free". On the contrary, "0" indicates having a job, i.e., the computation node state is "in use".

Figure 10A:
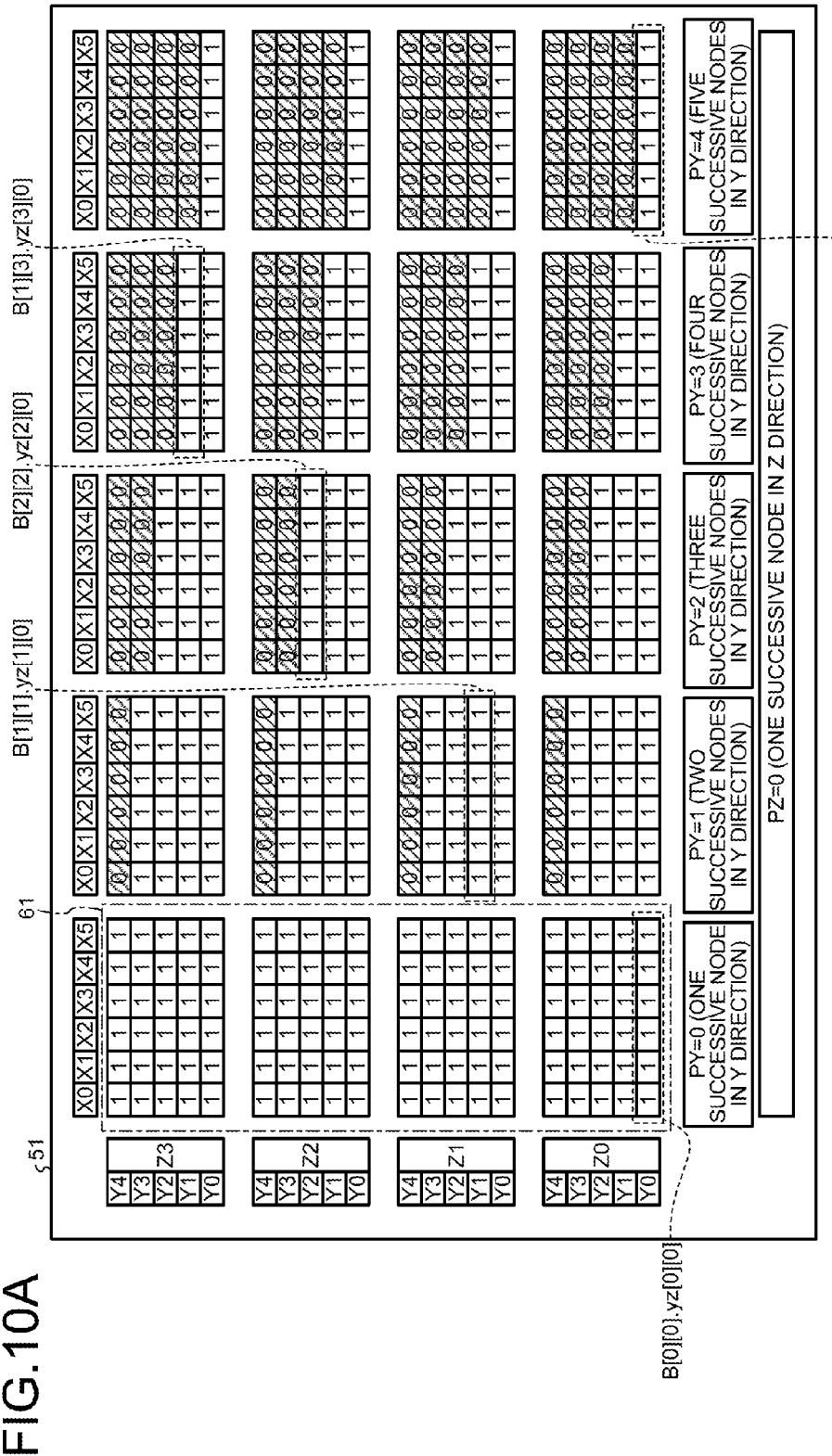
FIG. 10A is a drawing of a hierarchical data structure of a hierarchical data storage unit.
Figure 10B:
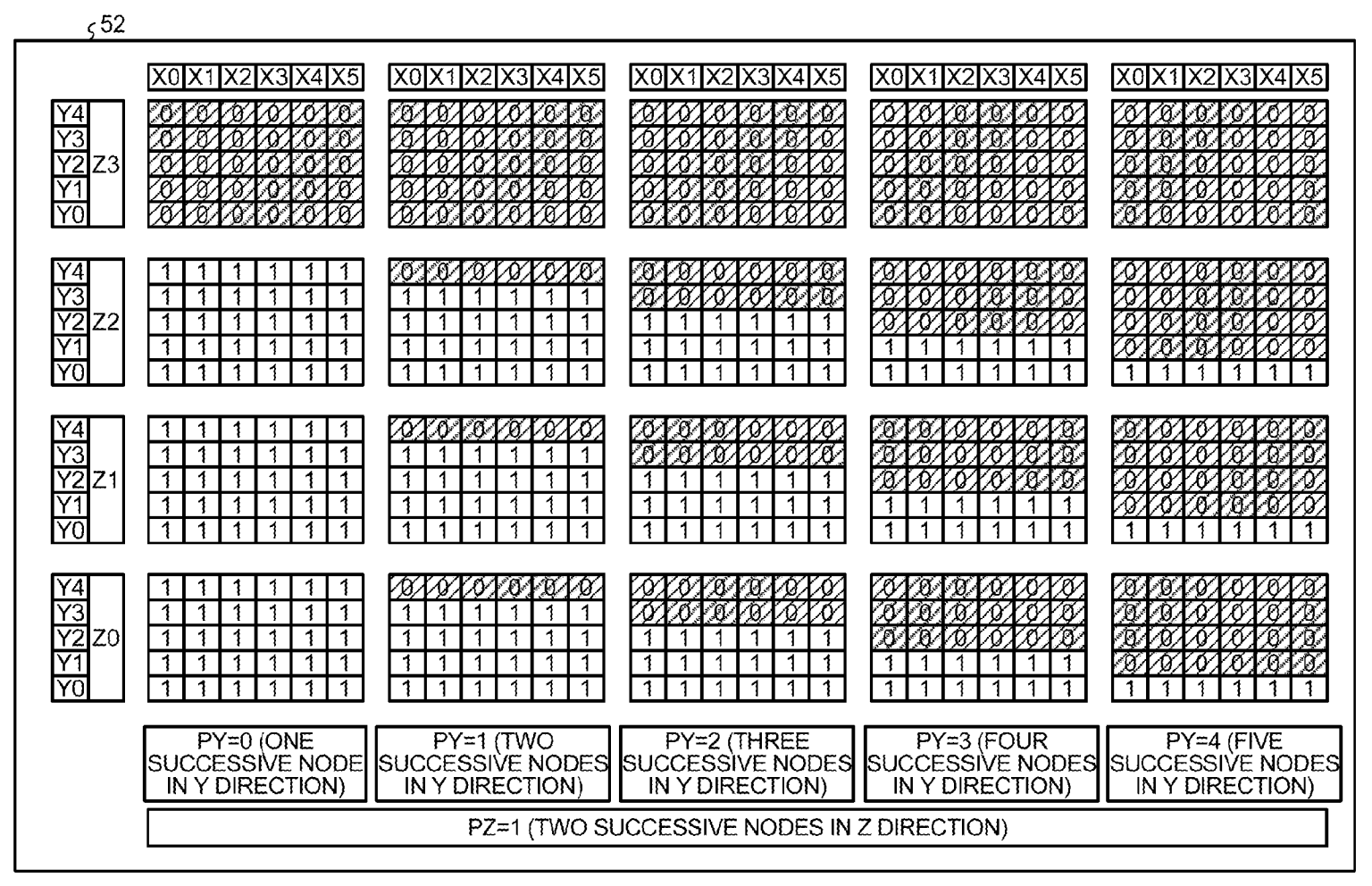
Figure 10C:
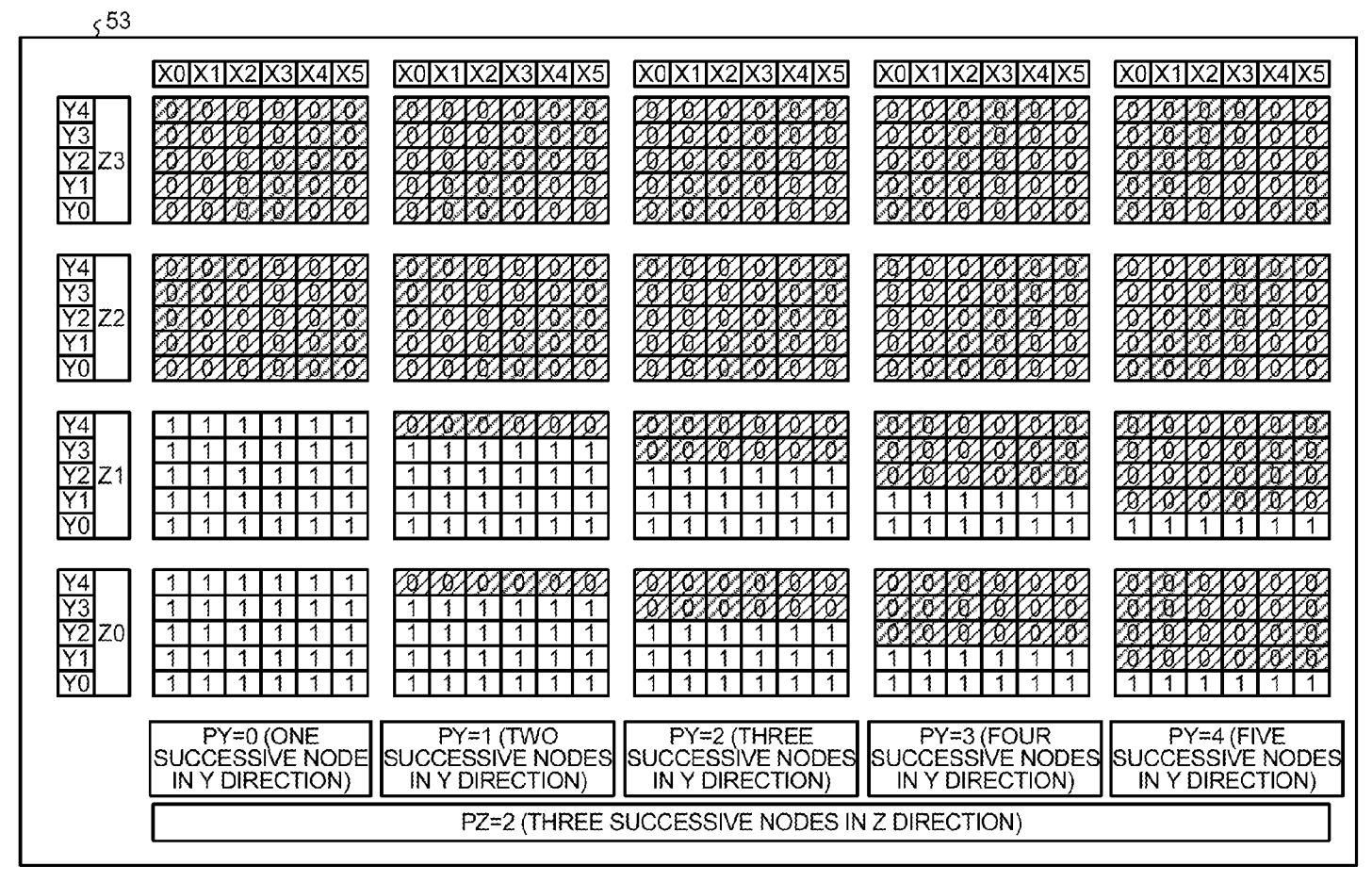
Figure 10D:
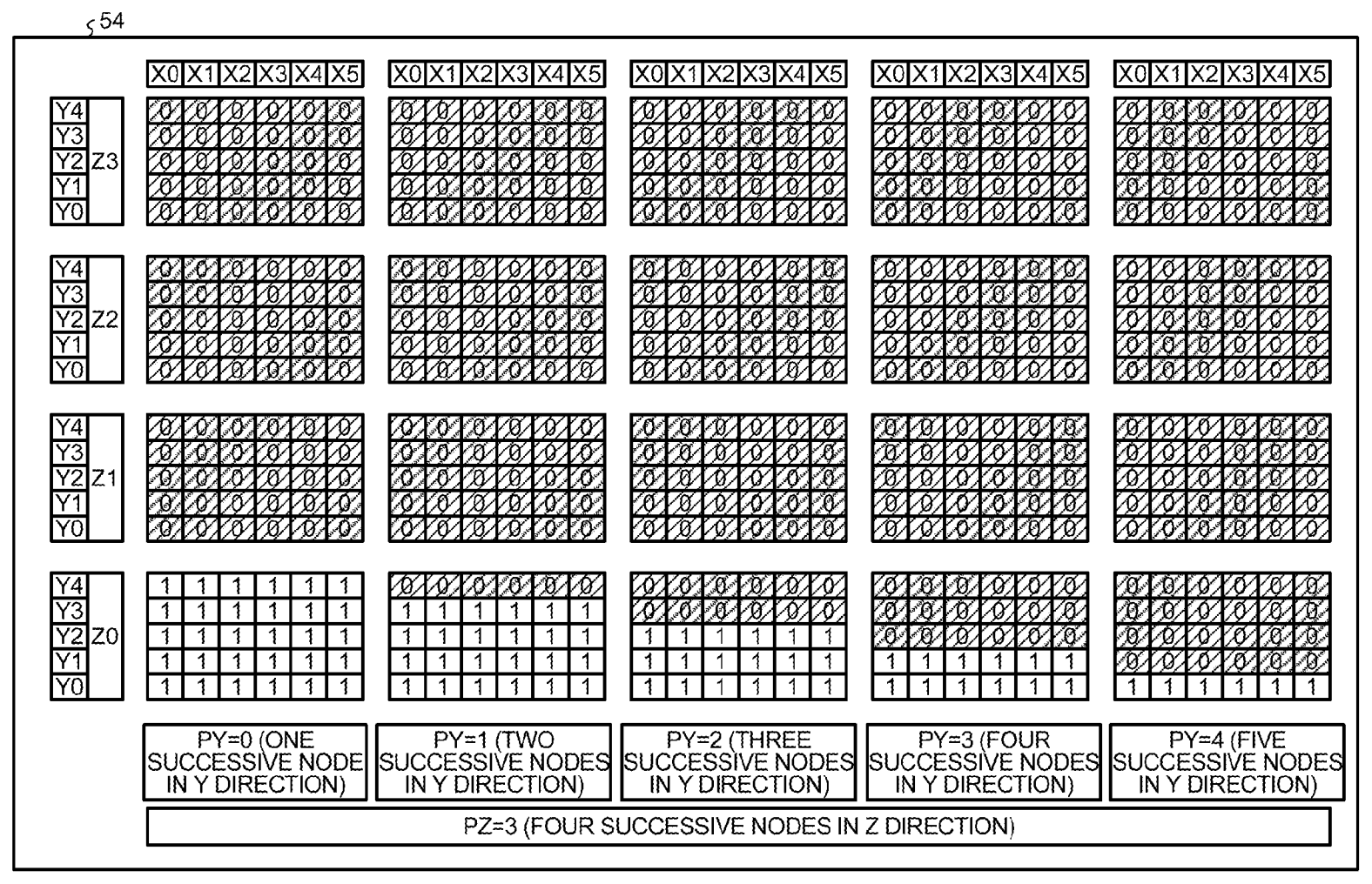

FIGS. 10A to 10D are drawings of the hierarchical data structure of the hierarchical data storage unit 41. FIG. 10A illustrates a block 51 corresponding to one successive node in the Z direction (PZ=0). FIG. 10B illustrates a block 52 corresponding to two successive nodes in the Z direction (PZ=1). FIG. 10C illustrates a block 53 corresponding to three successive nodes in the Z direction (PZ=2). FIG. 10D illustrates a block 54 corresponding to four successive nodes in the Z direction (PZ=3). In the above description, n successive nodes in the Z direction (where n=1, 2, 3, or 4) means that the computation nodes 11 are successively in a free state in the Z direction. Each of the PZ values equals "[the number of successive free nodes in the Z direction]−1". FIGS. 10A to 10D illustrate the four blocks 51 to 54 in the largest hierarchical layer.

In each of the blocks, there are five blocks (PY=0, 1, 2, 3, or 4) corresponding to "n successive nodes in the Y direction (where n=1, 2, 3, 4, or 5)", respectively, where "n successive nodes in the Y direction (where n=1, 2, 3, 4, or 5)" means that the computation nodes 11 are successively in a free state in the Y direction. Each of the PY values equals "[the number of successive free nodes in the Y direction]-1".

In FIGS. 10A to 10D, each of the bits represents computation node information on the X-axis expressed as B[Y][Z].yz[PY][PZ], where B[Y][Z].yz[PY][PZ] indicates whether there are as many successive free computation nodes 11 as "PY+1" in the Y direction and as many successive free computation nodes 11 as "PZ+1" in the Z direction, while using the computation node 11 at the coordinates (n,Y,Z) as a starting point (where n=0, 1, 2, 3, 4, or 5). The value "1" indicates that there are, whereas "0" indicates that there are not.

For example, in FIG. 10A, B[0][0].yz[0][0] indicates whether there is one successive free computation node 11 in the Y direction and in the Z direction, while using the computation node 11 at the coordinates (n,0,0) as a starting point (where n=0, 1, 2, 3, 4 or 5). As another example, B[1][1].yz[1][0] indicates whether there are two successive free computation nodes 11 in the Y direction and one successive free computation node 11 in the Z direction, while using the computation node 11 at the coordinates (n,1,1) as a starting point (where n=0, 1, 2, 3, 4 or 5). As yet another example, B[2][2].yz[2][0] indicates whether there are three successive free computation nodes 11 in the Y direction and one successive free computation node 11 in the Z direction, while using the computation node 11 at the coordinates (n,2,2) as a starting point (where n=0, 1, 2, 3, 4 or 5). As yet another example, B[1][3].yz[3][0] indicates whether there are four successive free computation nodes 11 in the Y direction and one successive free computation node 11 in the Z direction, while using the computation node 11 at the coordinates (n,1,3) as a starting point (where n=0, 1, 2, 3, 4 or 5).

The areas indicated with hatching indicate that the information is invalid due to the relation between the number of successive free nodes in the Y direction and the Y-coordinate of the computation node 11 used as a starting point. For example, if the Y-coordinate of the computation node 11 used as a starting point is 3, there are only two computation nodes 11 in the Y direction. Thus, there is no possibility that three or more computation nodes 11 are successively free.

Further, in FIG. 10A, a block 61 corresponding to PY=0 in PZ=0 represents pieces of data obtained from a bit conversion process performed on the state of each of the computation nodes illustrated in FIG. 9. It should be noted, however, that FIG. 10A illustrates the situation where all the computation nodes 11 are in a free state. As an initial state, the hierarchical data storage unit 41 stores therein only the block 61 corresponding to PY=0 in PZ=0, which is illustrated in FIG. 10A. The data in the other parts are created by the searching unit 43 from the data in the block 61.

Figure 11:
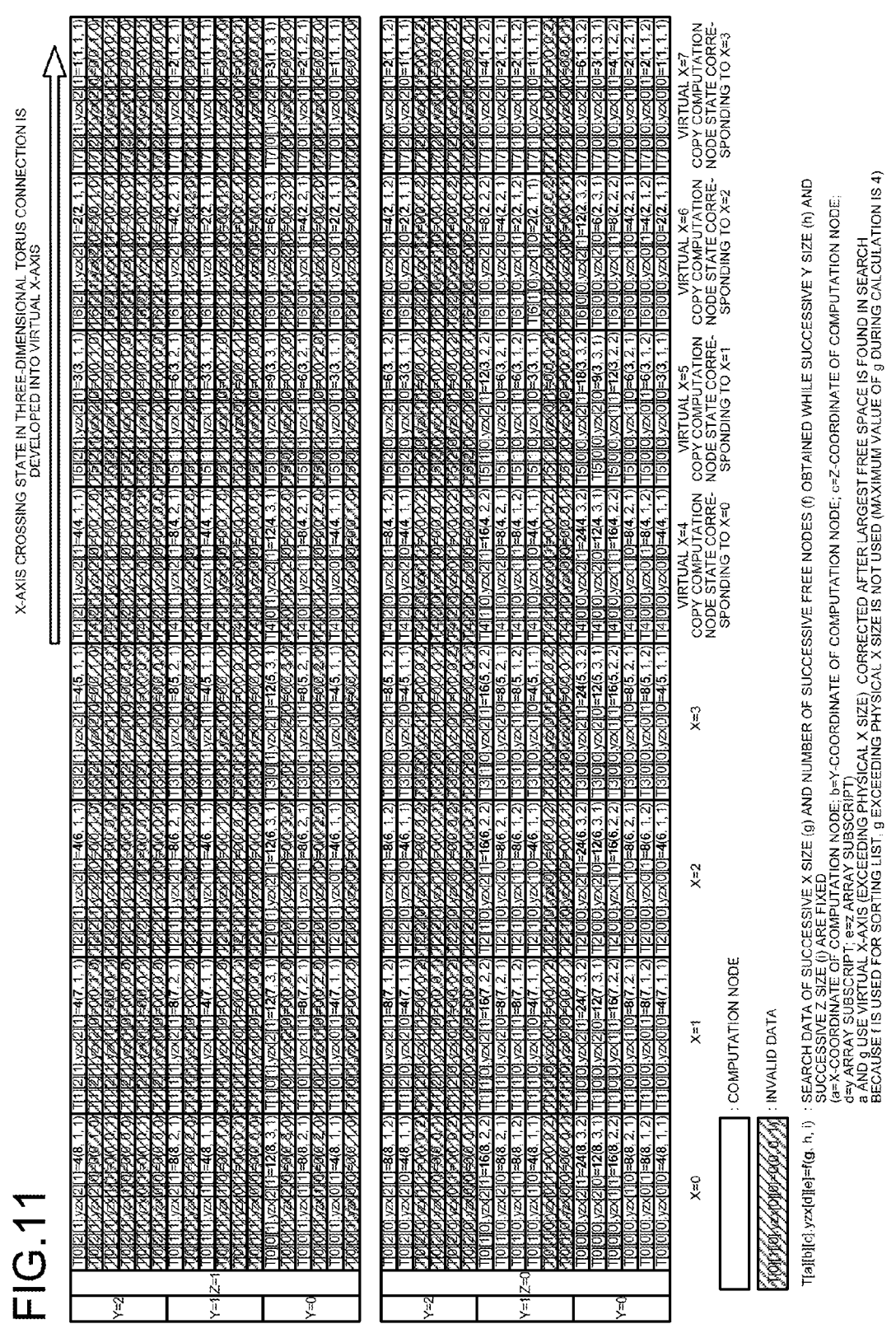

Returning to the description of FIG. 8, the search data storage unit 42 is configured to store therein search data about successive free nodes. FIG. 11 is a drawing of an exemplary data structure of the search data storage unit 42. FIG. 11 illustrates search data about the number of successive free computation nodes aligned toward the maximum X-Y-Z coordinates, for each of the computation nodes 11 at a set of X-Y-Z coordinates. For the sake of convenience in the explanation, FIG. 11 illustrates an example in which four computation nodes 11 are arranged in the X direction, three computation nodes 11 are arranged in the Y direction, and two computation nodes 11 are arranged in the Z direction.

The data for each of the X-Y-Z coordinate positions includes search data about a successive X size that is obtained by incrementing the successive Y size by 1 at a time from the set of coordinates toward the Y=2 coordinates and incrementing the successive Z size by 1 at a time from the set of coordinates toward the Z=1 coordinates. In other words, the data for each of the X-Y-Z coordinate positions includes search data T[a][b][c].yzx[d][e]=f(g,h,i) about a successive X size "g" and the number of successive free nodes "f" obtained while the successive Y size "h" and the successive Z size "i" are fixed, where "a" "b", and "c" denote the X-coordinate, the Y-coordinate, and the Z-coordinate, respectively, of the computation node 11 used as a starting point, "d" is a y array subscript having a value from 0 to 2, and "e" is a z array subscript having a value from 0 to 1. Further, all the values except for "f" and "g" are each a fixed value and are configured in initial setting. The values of "f" and "g" are each set to "0" in the initial setting. In FIG. 11, the values of "f" and "d" found in the search are indicated in bold text.

For example, the data for the origin T[0][0][0] includes search data about a successive X size corresponding to when the successive Z size=1 or 2, while the successive Y size is 1, 2, or 3. The data for the maximum X-Y-Z coordinates T[7][2][1] includes search data about a successive X size corresponding to when the successive Y size=1, while the successive Z size=1.

FIG. 11 illustrates the search data corresponding to the situation where all the computation nodes 11 are in a free state. Further, the areas indicated with hatching in FIG. 11 represent pieces of invalid data. For example, if Y=1, the successive Y size "h" is either 1 or 2 and cannot be 3. Thus, the y array subscript is either 1 or 2. If Y=2, because the successive Y size "h" can only be 1, the y array subscript is only 1.

FIG. 12 is a drawing of a sorted result obtained from the search data illustrated in FIG. 11. As illustrated in FIG. 12, the search data is sorted according to the numbers of successive free nodes.

Returning to the description of FIG. 8, the searching unit 43 is configured to search for the number of successive free nodes by using the hierarchical data storage unit 41, in the increasing directions of the X-axis including the virtual axis, the Y-axis, and the Z-axis, while using the computation node 11 at each of the X-Y-Z coordinate positions as a starting point and is configured to write a search result into the search data storage unit 42.

Figure 13:
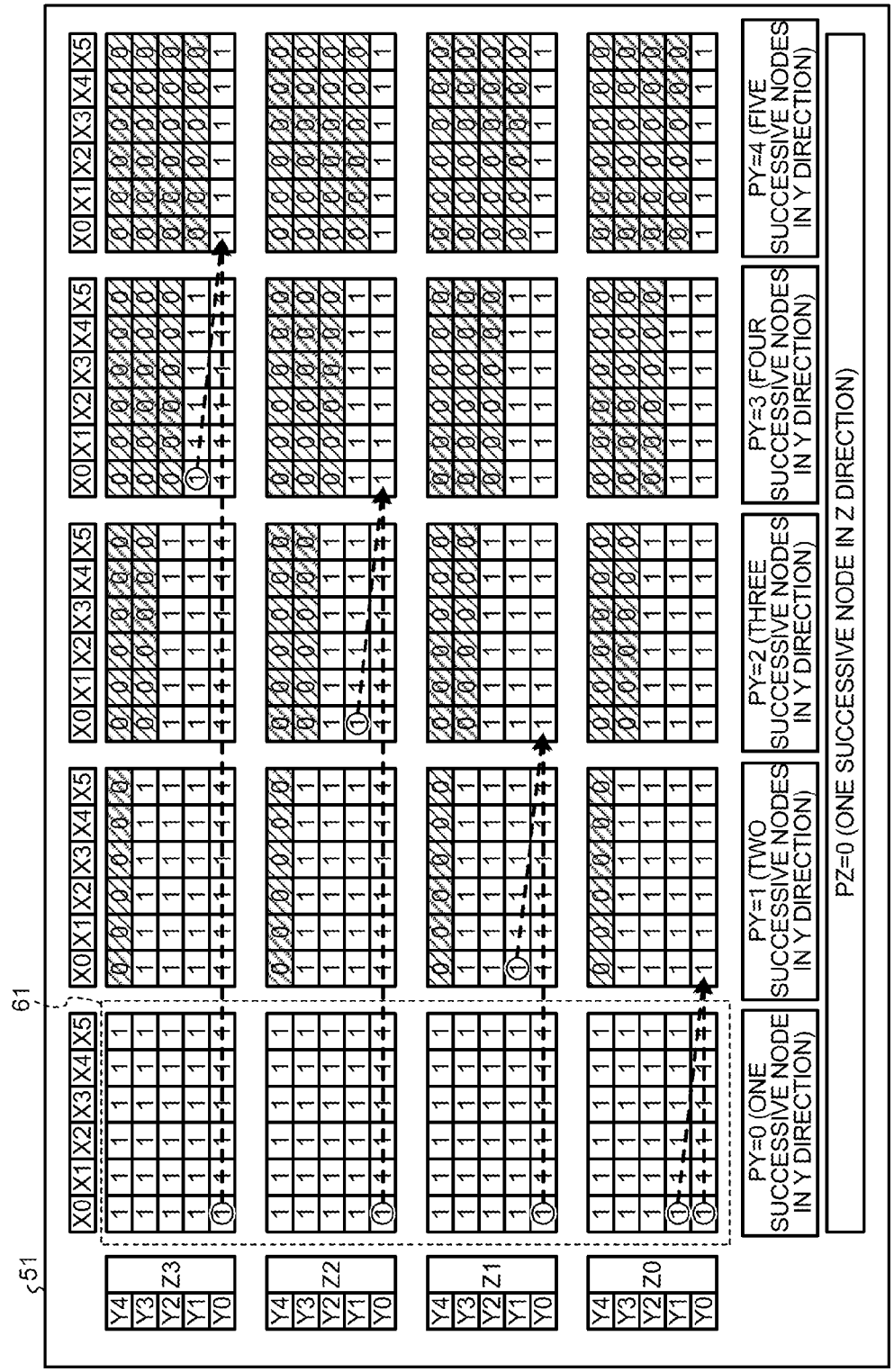
FIG. 13 is a drawing for explaining a Y direction searching process for one successive node in the Z direction.

More specifically, first, the searching unit 43 performs a Y direction searching process for one successive node in the Z direction to create the block 51 for one successive node in the Z direction illustrated in FIG. 10A. FIG. 13 is a drawing for explaining the Y direction searching process for one successive node in the Z direction. Within the block 51, the block 61 corresponding to PY=0 contains information obtained by performing a bit conversion process on the state of each of the computation nodes 11. On the basis of the data in the block 61, the searching unit 43 sequentially calculates information corresponding to the values from PY=1 (two success nodes in the Y direction) to PY=4 (five successive nodes in the Y direction).

Because the data in the block corresponding to PY=1 is information about two successive free nodes in the Y direction, it is possible to obtain the data by calculating a logical product of two pieces of data in the block corresponding to PY=0. For example, it is possible to calculate the state of the six computation nodes 11 corresponding to B[0][0].yz[1][0] by calculating a logical product, only one time, of B[0][0].yz[0][0] and B[1][0].yz[0][0]. Incidentally, because the data in the block corresponding to PY=1 is information about two successive free nodes in the Y direction, the pieces of data for the Y=4 coordinates are certain to be 0. Thus, there is no need to calculate the pieces of data for the Y=4 coordinates. In FIG. 13, the following pieces of data indicated with hatching are the pieces of data that require no calculation: B[4][0].yz[1][0]; B[4][1].yz[1][0]; B[4][2].yz[1][0]; and B[4][3].yz[1][0].

Further, because the data in the block corresponding to PY=2 is information about three successive free nodes in the Y direction, it is possible to obtain the data by calculating a logical product of two pieces of data in the block corresponding to PY=0 and the block corresponding to PY=1. For example, it is possible to calculate the state of the six computation nodes 11 corresponding to B[0][1].yz[2][0] by calculating a logical product, only one time, of B[0][1].yz[0][0] and B[1][1].yz[1][0]. Incidentally, the pieces of data for the Y=4 coordinates and the Y=3 coordinates are certain to be 0. Thus, there is no need to calculate the pieces of data for the Y=4 coordinates and the Y=3 coordinates.

Similarly, because the data in the block corresponding to PY=3 is information about four successive free nodes in the Y direction, it is possible to obtain the data by calculating a logical product of two pieces of data in the block corresponding to PY=0 and the block corresponding to PY=2. For example, it is possible to calculate the state of the six computation nodes 11 corresponding to B[0][2].yz[3][0] by calculating a logical product, only one time, of B[0][2].yz[0][0] and B[1][2].yz[2][0]. Similarly, because the data in the block corresponding to PY=4 is information about five successive free nodes in the Y direction, it is possible to obtain the data by calculating a logical product of two pieces of data in the block corresponding to PY=0 and the block corresponding to PY=3. For example, it is possible to calculate the state of the six computation nodes 11 corresponding to B[0][3].yz[4][0] by calculating a logical product, only one time, of B[0][3].yz[0][0] and B[1][3].yz[3][0].

An important feature of the Y direction searching process for one successive node in the Z direction is that the searching unit 43 is able to conduct the search for the number of successive free nodes in six computation nodes 11 by calculating a logical product only one time. Another important feature of the Y direction searching process for one successive node in the Z direction is that the number of times a logical product is calculated does not increase even if the number of successive nodes in the Y direction increases. In contrast, according to a commonly-used method, it is necessary to calculate a logical product four times in order to obtain the number of free nodes with five successive nodes in the Y direction. Yet another important feature of the Y direction searching process for one successive node in the Z direction is that unnecessary calculation is not performed with respect to the pieces of data of which the number of successive nodes in the Y direction is 2 or larger.

Figure 14:
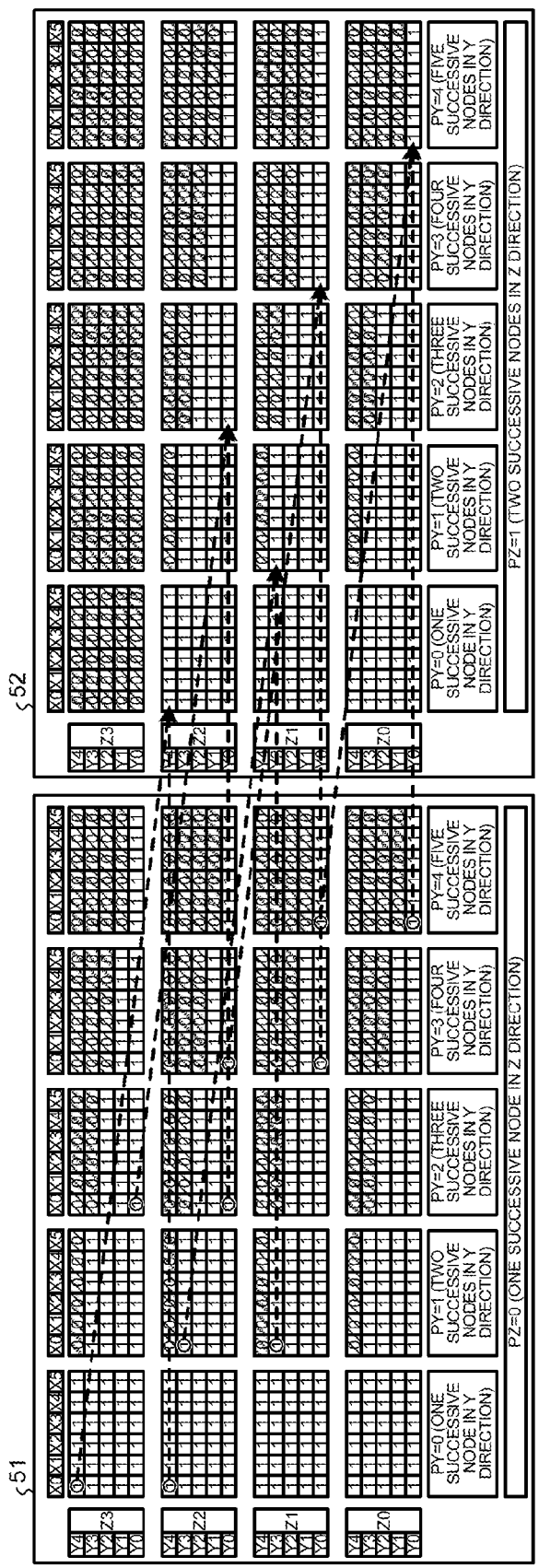
FIG. 14 is a drawing for explaining a Y direction searching process for two successive nodes in the Z direction.

When the creation of the block 51 for one successive node in the Z direction has been completed as a result of the Y direction searching process for one successive node in the Z direction, the searching unit 43 performs a Y direction searching process for two successive nodes in the Z direction, to create a block 52 for two successive nodes in the Z direction illustrated in FIG. 10B. FIG. 14 is a drawing for explaining the Y direction searching process for two successive nodes in the Z direction. On the basis of the data in the block 51 corresponding to PZ=0, the searching unit 43 sequentially calculates information corresponding to PZ=1 (two success nodes in the Z direction) concurrently with the values from PY=0 (one successive node in the Y direction) to PY=4 (five successive nodes in the Y direction). In the same manner as the process illustrated in FIG. 13, the searching unit 43 is able to conduct the search for the number of successive free nodes in six computation nodes 11 by calculating a logical product only one time.

Because the data in the block corresponding to PY=0 is information about two successive nodes in the Z direction together with one successive free node in the Y direction, it is possible to obtain the data by calculating a logical product of two pieces of data in the block corresponding to PY=0 within the block corresponding to PZ=0. For example, it is possible to calculate the state of the six computation nodes 11 corresponding to B[4][2].yz[0][1] by calculating a logical product, only one time, of B[4][2].yz[0][0] and B[4][3].yz[0][0]. Incidentally, because the data in the block 52 corresponding to PZ=1 is information about two successive free nodes in the Z direction, the pieces of data for the Z=3 coordinates are certain to be 0. Thus, there is no need to calculate the pieces of data for the Z=3 coordinates. In FIG. 14, the following pieces of data indicated with hatching are the pieces of data that require no calculation: B[0][3].yz[0][1] to B[4][3].yz[0][1].

Because the data in the block corresponding to PY=1 is information about two successive nodes in the Z direction together with two successive free nodes in the Y direction, it is possible to obtain the data by calculating a logical product of two pieces of data in the block corresponding to PY=1 within the block corresponding to PZ=0. For example, it is possible to calculate the state of the six computation nodes 11 corresponding to B[3][1].yz[1][1] by calculating a logical product, only one time, of B[3][1].yz[1][0] and B[3][2].yz[1][0]. Incidentally, because the data is information about two successive free nodes in the Z direction, the pieces of data for the Z=3 coordinates are certain to be 0. Also, because the data is information about two successive free nodes in the Y direction, the pieces of data for the Y=4 coordinates are certain to be 0. Thus, there is no need to calculate the pieces of data for these coordinates. In FIG. 14, the following pieces of data indicated with hatching are the pieces of data that require no calculation: B[0][3].yz[1][1] to B[4][3].yz[1][1]; B[4][0].yz[1][1]; B[4][1].yz[1][1]; and B[4][2].yz[1][1].

The data in the blocks corresponding to the values from PY=2 to PY=4 is calculated in a similar manner. Like the process illustrated in FIG. 13, an important feature of the Y direction searching process for two successive nodes in the Z direction is that the searching unit 43 is able to conduct the search for the number of successive free nodes in six computation nodes 11 by calculating a logical product only one time. Another important feature of the Y direction searching process for two successive nodes in the Z direction is that the number of times a logical product is calculated does not increase even if the number of successive nodes in the Z direction and the number of successive nodes in the Y direction increase. In contrast, according to a commonly-used method, it is necessary to calculate a logical product eight times in order to obtain the number of free nodes with two successive nodes in the Z direction together with five successive nodes in the Y direction. Yet another important feature of the Y direction searching process for two successive nodes in the Z direction is that unnecessary calculation is not performed with respect to the pieces of data of which the number of successive nodes in the Z direction and the Y direction is 2 or larger.

When the Y direction searching process for two successive nodes in the Z direction has been completed, the searching unit 43 performs a Y direction searching process for three success nodes in the Z direction and a Y direction searching process for four successive nodes in the Z direction in a similar manner. After that, when the calculations for all the blocks have been finished, the searching unit 43 finally performs a process of calculating a successive X size from each of the sets of X-Y-Z coordinates and writes a result into the search data storage unit 42, where the process of calculating the successive X size from each of the sets of X-Y-Z coordinates is a process of counting the number of bits that are successively in an ON state (i.e., the state where the bit is "1"), from the X-coordinate.

Accordingly, a process performed by the searching unit 43 to obtain the number of successive ON bits from an arbitrary position among 64 bits will be explained, while using an example in which 64 computation nodes 11 are arranged in the X direction. In a commonly-used searching process, because a logical product calculation is repeatedly performed on the target 64 bits by sequentially shifting one bit to the left (or to the right), it is necessary to perform the condition judging process 64 times at maximum. In contrast, the searching unit 43 is able to reduce the number of times the condition judging process is performed by using a data structure illustrated in FIG. 15 and a bit number table 48 illustrated in FIG. 16.

Figure 15:
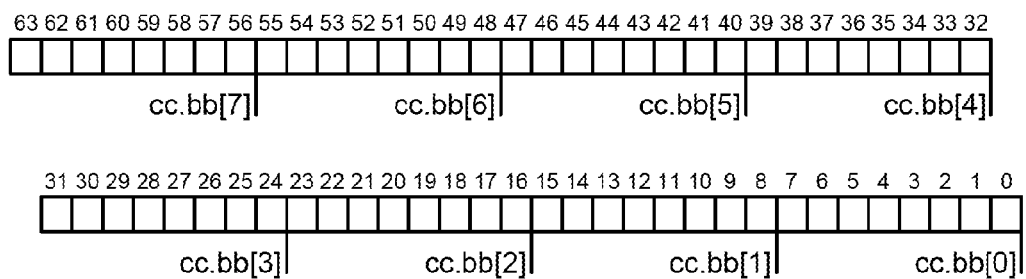
FIG. 15 is a drawing of an exemplary data structure used for a process of searching for the number of successive ON bits from 64 bits.

FIG. 15 is a drawing of an exemplary data structure used for the process of searching for the number of successive ON bits from 64 bits. As illustrated in FIG. 15, a union "cc" can be used as a piece of 64-bit data "cc.aa" and as eight pieces of 8-bit data "cc.bb[0]" to "cc.bb[7]". At first, the searching unit 43 assigns a piece of search target 64-bit data to cc.aa, in such a manner that an arbitrary search position comes to the left end (the 63 bit position in FIG. 15). After that, the searching unit 43 takes out 8-bit sections (cc.bb[7] to cc.bb[0]) from the left end of the data and repeatedly performs (eight times) the process of directly counting the number of successive ON bits in each 8-bit section by referring to the bit number table 48 illustrated in FIG. 16. An important feature of this process is that it is possible to end the process at the point in time when the number of successive ON bits in the 8-bit section becomes smaller than 8.

Figure 17:
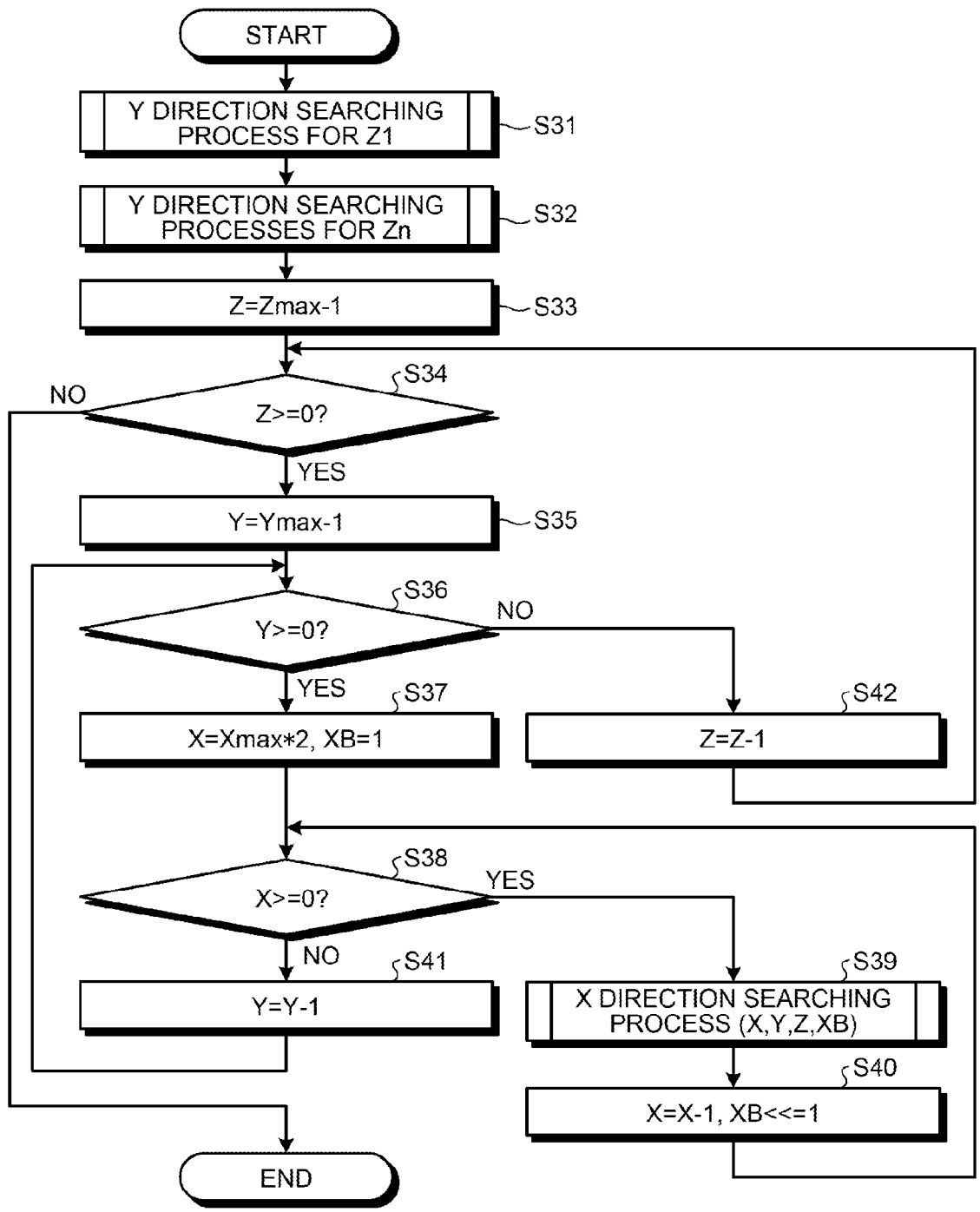
FIG. 17 is a flowchart of a flow in a searching process performed by a searching unit.

Next, a flow in a searching process performed by the searching unit 43 will be explained. FIG. 17 is a flowchart of the flow in the searching process performed by the searching unit 43. As illustrated in FIG. 17, to create the hierarchical data illustrated in FIGS. 10A to 10D, the searching unit 43 performs a Y direction searching process for Z1 and Y direction searching processes for Zn, (steps S31 and S32), where the Y direction searching process for Z1 represents the Y direction searching process for one successive node in the Z direction, whereas the Y direction searching processes for Zn represent the Y direction searching processes for 2 to 4 successive nodes in the Z direction.

After that, the searching unit 43 initializes Z to Zmax−1 (step S33), where Zmax is the number of computation nodes arranged in the Z direction. Further, the searching unit 43 judges whether Z is equal to or larger than 0 (step S34). If Z is not equal to or larger than 0, the process is ended.

On the contrary, if Z is equal to or larger than 0, the searching unit 43 initializes Y to Ymax−1 (step S35). After that, the searching unit 43 judges whether Y is equal to or larger than 0 (step S36). If Y is equal to or larger than 0, the searching unit 43 initializes X to a value that is twice as large as Xmax to accommodate the virtual X-axis and initializes a variable XB indicating a bit position to 1 (step S37). After that, the searching unit 43 judges whether X is equal to or larger than 0 (step S38). If X is equal to or larger than 0, the searching unit 43 performs an X direction searching process (X,Y,Z,XB) to search for successive free nodes in the X direction (step S39).

Subsequently, the searching unit 43 decrements X by 1 and shifts XB to the left by one bit (step S40). After that, the process returns to step S38, so that the searching unit 43 performs an X direction searching process (X,Y,Z,XB), by using the computation node 11 of which the X direction coordinate is smaller by 1, as a starting point.

On the contrary, if X is not equal to or larger than 0 (step S38: No), the searching unit 43 decrements Y by 1 (step S41), and the process returns to step S36 so that the searching unit 43 processes the next Y. If Y is not equal to or larger than 0 (step S36: No), the searching unit 43 decrements Z by 1 (step S42), and the process returns to step S34 so that the searching unit 43 processes the next Z plane.

As explained above, by searching for the successive free nodes by using the hierarchical data structure, the searching unit 43 is able to reduce the number of condition judging processes.

Figure 18:
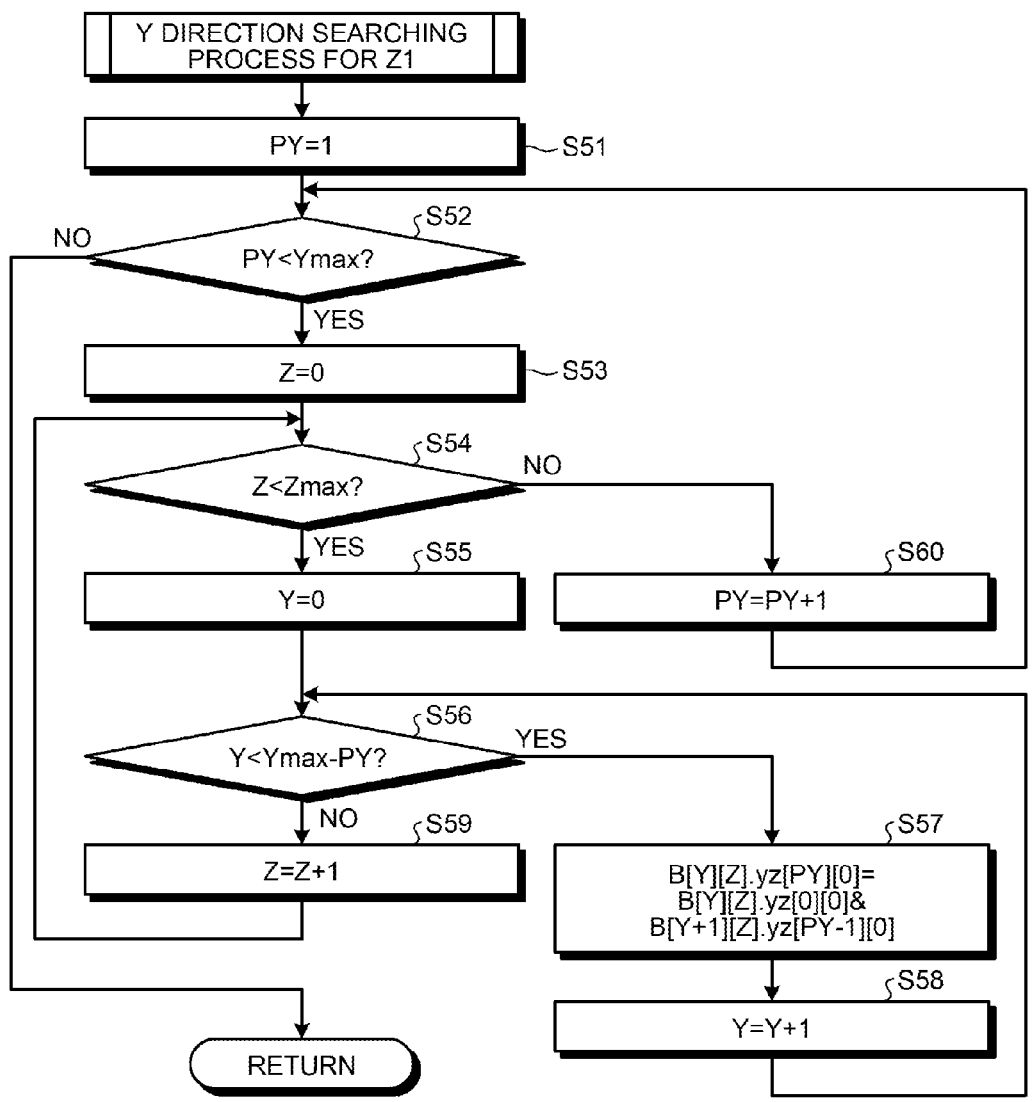
FIG. 18 is a flowchart of a flow in a Y direction searching process for Z1.

Next, a flow in the Y direction searching process for Z1 will be explained. FIG. 18 is a flowchart of the flow in the Y direction searching process for Z1. As illustrated in FIG. 18, the searching unit 43 initializes PY to 1 (step S51). After that, the searching unit 43 judges whether PY is smaller than Ymax (step S52). If PY is not smaller than Ymax, because it means that the process has been finished for all the PY's, the searching process is ended.

On the contrary, if PY is smaller than Ymax, the searching unit 43 initializes Z to 0 (step S53) and judges whether Z is smaller than Zmax (step S54). If Z is smaller than Zmax, the searching unit 43 initializes Y to 0 (step S55) and judges whether Y is smaller than Ymax-PY (step S56). The reason why the searching unit 43 judges whether Y is smaller than Ymax-PY is that the areas indicated with hatching in FIG. 13 require no calculation of data.

If Y is smaller than Ymax-PY, the searching unit 43 performs the process illustrated in FIG. 13. In other words, the searching unit 43 calculates B[Y][Z].yz[PY][0]=B[Y][Z].yz[0][0]&B[Y+1][Z].yz[PY-1][0] (step S57). After that, the searching unit 43 increments Y by 1 (step S58), and the process returns to step S56, so that the searching unit 43 processes the next Y.

On the contrary, if Y is not smaller than Ymax-PY (step S56: No), the searching unit 43 increments Z by (step S59), and the process returns to step S54, so that the searching unit 43 processes the next Z. If Z is not smaller than Zmax (step S54: No), the searching unit 43 increments PY by 1 (step S60), and the process returns to step S52, so that the searching unit 43 processes the next PY.

As explained above, by performing the Y direction searching process for Z1, the searching unit 43 is able to calculate the data in the block 51 illustrated in FIG. 10A.

Figure 19:
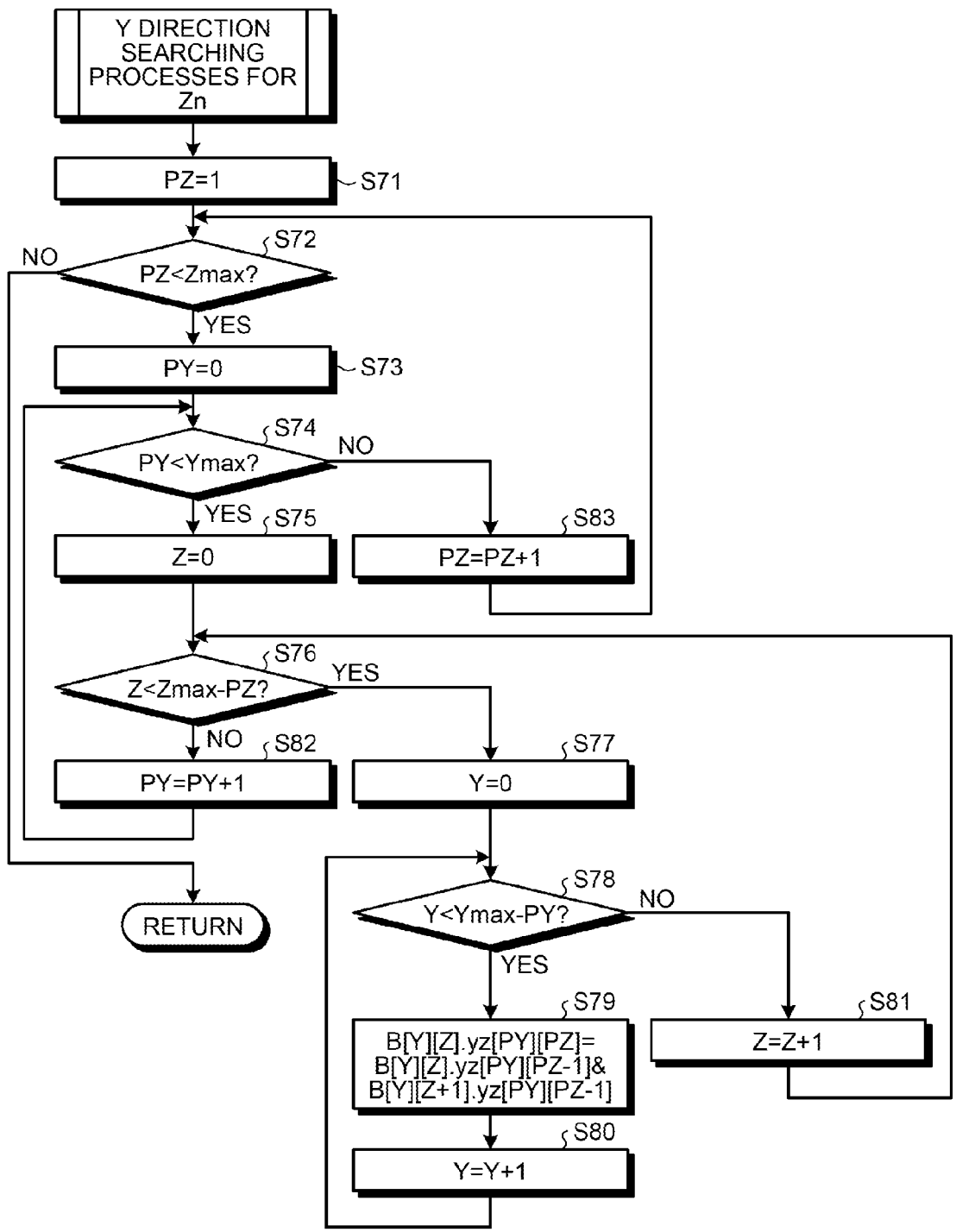
FIG. 19 is a flowchart of a flow in a Y direction searching processes for Zn.

Next, a flow in the Y direction searching processes for Zn will be explained. FIG. 19 is a flowchart of the flow in the Y direction searching processes for Zn. As illustrated in FIG. 19, the searching unit 43 initializes PZ to 1 (step S71). After that, the searching unit 43 judges whether PZ is smaller than Zmax (step S72). If PZ is not smaller than Zmax, because it means that the process has been finished for all the PZ's, the searching process is ended.

On the contrary, if PZ is smaller than Zmax, the searching unit 43 initializes PY to 0 (step S73). After that, the searching unit 43 judges whether PY is smaller than Ymax (step S74). If PY is smaller than Ymax, the searching unit 43 initializes Z to 0 (step S75) and judges whether Z is smaller than Zmax-PZ (step S76). If Z is smaller than Zmax-PZ, the searching unit 43 initializes Y to 0 (step S77) and judges whether Y is smaller than Ymax-PY (step S78). The reason why the searching unit 43 judges whether Z is smaller than Zmax-PZ and whether Y is smaller than Ymax-PY is that the areas indicated with hatching in FIG. 14 require no calculation of data.

If Y is smaller than Ymax-PY, the searching unit 43 performs the process illustrated in FIG. 14. In other words, the searching unit 43 calculates B[Y][Z].yz[PY][PZ]=B[Y][Z].yz[PY][PZ-1]&B[Y][Z+1].yz[PY][PZ-1] (step S79). After that, the searching unit 43 increments Y by 1 (step S80), and the process returns to step S78 so that the searching unit 43 processes the next Y.

On the contrary, if Y is not smaller than Ymax-PY (step S78: No), the searching unit 43 increments Z by (step S81), and the process returns to step S76, so that the searching unit 43 processes the next Z. If Z is not smaller than Zmax-PZ (step S76: No), the searching unit 43 increments PY by 1 (step S82), and the process returns to step S74, so that the searching unit 43 processes the next PY. If PY is not smaller than Ymax (step S74: No), the searching unit 43 increments PZ by 1 (step S83), and the process returns to step S72, so that the searching unit 43 processes the next PZ.

As explained above, by performing the Y direction searching processes for Zn, the searching unit 43 is able to calculate the data in the blocks 52 to 54 illustrated in FIGS. 10B to 10D.

Figure 20:
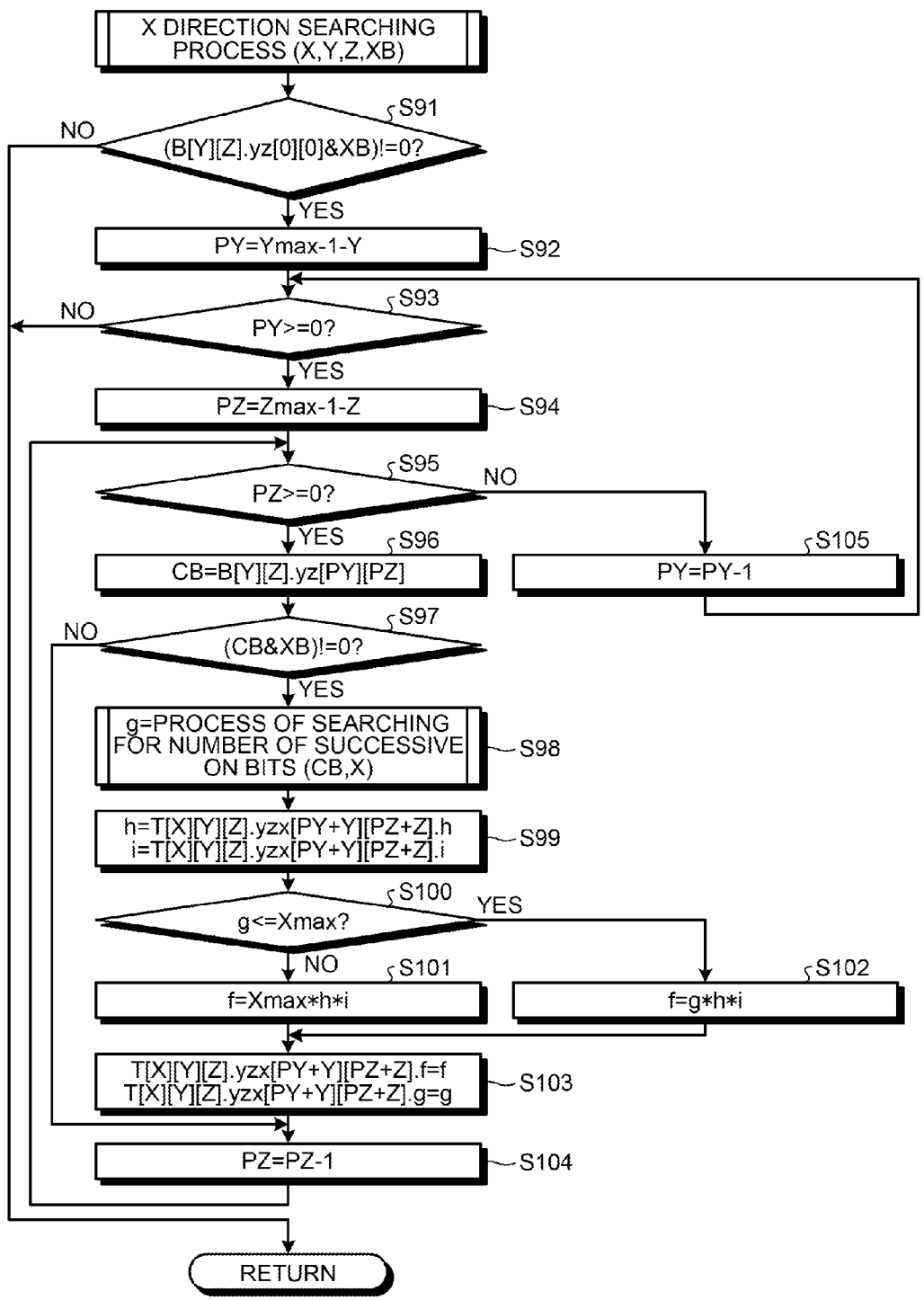
FIG. 20 is a flowchart of a flow in an X direction searching process (X,Y,Z,XB)

Next, a flow in the X direction searching process (X,Y,Z, XB) will be explained. FIG. 20 is a flowchart of the flow in the X direction searching process (X,Y,Z,XB). As illustrated in FIG. 20, the searching unit 43 judges whether B[Y][Z].yz[0][0]&XB is 0 or not (step S91), where because XB denotes the head bit position to search for successive free nodes in the X direction, it means that the searching unit 43 judges whether the computation node 11 at the head is free or not by performing the judging process at step S91.

If the computation node 11 at the head is not free, the searching unit 43 ends the process. In this situation, the values of f indicating the number of successive free nodes in the search data and g indicating a successive X size illustrated in FIG. 11 are each set to 0, which is the value set in initialization.

After that, the searching unit 43 initializes PY to Ymax−1−Y (step S92), where the reason why the searching unit 43 initializes PY to Ymax−1−Y is that the areas indicated with hatching in FIG. 11 require no calculation.

After that, the searching unit 43 judges whether PY is equal to or larger than 0 (step S93). If PY is not equal to or larger than 0, the process is ended. On the contrary, if PY is equal to or larger than 0, the searching unit 43 initializes PZ to Zmax−1−Z (step S94), where the reason why the searching unit 43 initializes PZ to Zmax−1−Z is that the areas indicated with hatching in FIG. 11 require no calculation.

Subsequently, the searching unit 43 judges whether PZ is equal to or lager than 0 (step S95). If PZ is equal to or larger than 0, the searching unit 43 sets CB to B[Y][Z].yz[PY][PZ] (step S96). In other words, from among X0 to X5 illustrated in FIGS. 10A to 10D, the searching unit 43 sets CB to X0 to X5 that are specified by PZ, PY, Z, and Y.

After that, the searching unit 43 judges whether CB&XB is 0 or not (step S97), where because XB denotes the head bit position to search for successive free nodes in the X direction, it means that the searching unit 43 judges whether the information about the successive free nodes at the head indicates a free state, by performing the judging process at step S97.

If the information about the successive free nodes at the head indicates a free state, the searching unit 43 performs a process of searching for the number of successive ON bits (CB,X) on CB while using X as the head and sets g to the number of successive ON bits (i.e., the successive X size) (step S98). After that, the searching unit 43 extracts a successive Y size expressed as T[X][Y][Z].yzx[PY+Y][PZ+Z].h and a successive Z size expressed as T[X][Y][Z].yzx[PY+Y][PZ+Z].i from the search data storage unit 42 and sets h and i to the extracted values, respectively (step S99). The successive Y size expressed as T[X][Y][Z].yzx[PY+Y][PZ+Z].h and the successive Z size expressed as T[X][Y][Z].yzx[PY+Y][PZ+Z].i stored in the search data storage unit 42 are configured in initial setting.

After that, the searching unit 43 judges whether the successive X size g is equal to or smaller than Xmax (step S100). If the successive X size g is not equal to or smaller than Xmax, because it means that the successive X size corresponds to the situation where X-axis is crossed, the searching unit 43 calculates the number of successive free nodes f by multiplying Xmax, the successive Y size h, and the successive Z size i (step S101). On the contrary, if the successive X size g is equal to or smaller than Xmax, because it means that the successive X size corresponds to a situation where the X-axis is not crossed, the searching unit 43 calculates the number of successive free nodes f by multiplying the successive X size g, the successive Y size h, and the successive Z size i (step S102).

After that, the searching unit 43 writes the calculated number of successive free nodes f as the number of successive free nodes expressed as T[X][Y][Z].yzx[PY+Y][PZ+Z].f in the search data storage unit 42. Further, the searching unit 43 writes the calculated successive X size g as the successive X size expressed as T[X][Y][Z].yzx[PY+Y][PZ+Z].g in the search data storage unit 42 (step S103). Subsequently, the searching unit 43 decrements PZ by 1 (step S104), and the process returns to step S95, so that the searching unit 43 processes the next PZ.

On the contrary, if CB&XB is 0 (step S97: No), because it means that the information about the successive free nodes at the head does not indicate a free state, the searching unit 43 proceeds to step S104. If PZ is not equal to or larger than 0 (step S95: No), the searching unit 43 decrements PY by 1 (step S105), and the process returns to step S93, so that the searching unit 43 processes the next PY.

As explained above, by performing the X direction searching process (X,Y,Z,XB), the searching unit 43 is able to calculate the number of successive free nodes and the successive X size from the hierarchical data.

Figure 21:
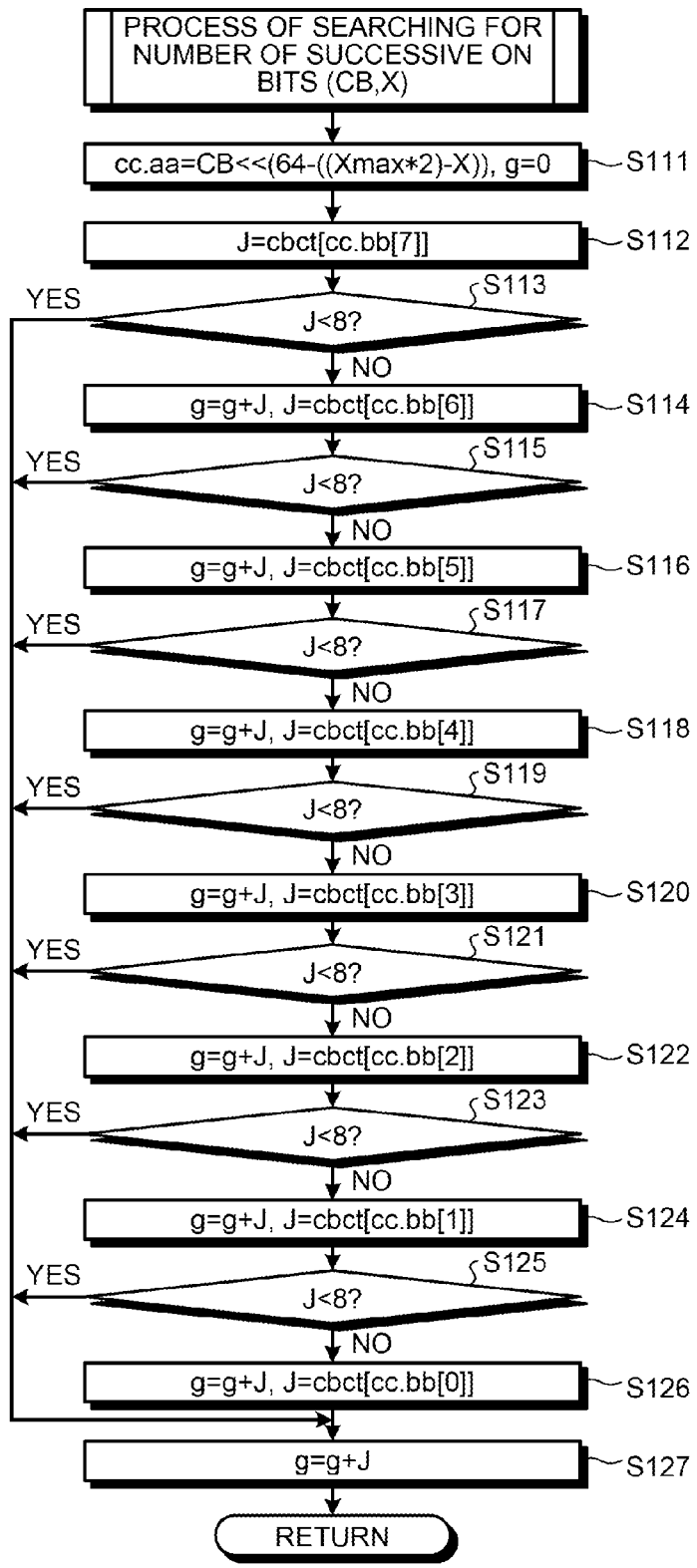
FIG. 21 is a flowchart of a flow in a process of searching for the number of successive ON bits (CB,X)

Next, a flow in the process of searching for the number of successive ON bits (CB,X) will be explained. FIG. 21 is a flowchart of the flow in the process of searching for the number of successive ON bits (CB,X). As illustrated in FIG. 21, the searching unit 43 sets cc.aa to a value obtained by shifting CB to the left by (64−((Xmax*2)−X)) and initializes g to 0 (step S111). By shifting CB to the left by (64−((Xmax*2)−X)), the searching unit 43 is able to set the bit sequence subject to the search in the farthest left position of cc.aa.

After that, the searching unit 43 searches for the number of successive ON bits in the uppermost eight bits cc.bb[7] from the bit number table 48 (cbct[256] illustrated in FIG. 16) and sets J to the number found in the search (step S112). Subsequently, the searching unit 43 judges whether J is smaller than 8 (step S113). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[6] from the bit number table 48, and sets J to the number found in the search (step S114). After that, the searching unit 43 judges whether J is smaller than 8 (step S115). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[5] from the bit number table 48, and sets J to the number found in the search (step S116). After that, the searching unit 43 judges whether J is smaller than 8 (step S117). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[4] from the bit number table 48, and sets J to the number found in the search (step S118). After that, the searching unit 43 judges whether J is smaller than 8 (step S119). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[3] from the bit number table 48, and sets J to the number found in the search (step S120). After that, the searching unit 43 judges whether J is smaller than 8 (step S121). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[2] from the bit number table 48, and sets J to the number found in the search (step S122). After that, the searching unit 43 judges whether J is smaller than 8 (step S123). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[1] from the bit number table 48, and sets J to the number found in the search (step S124). After that, the searching unit 43 judges whether J is smaller than 8 (step S125). If J is smaller than 8, because it means that the eight bits are not successively ON, the process proceeds to step S127, without conducting any search in the lower bits.

On the contrary, if J is not smaller than 8, because it means that the eight bits are successively ON, the searching unit 43 adds J to g, searches for the number of successive ON bits in the next eight bits cc.bb[0] from the bit number table 48, and sets J to the number found in the search (step S126).

After that, the searching unit 43 adds J to g (step S127) and returns g as the number of successive ON bits.

As explained above, by conducting the searches in the bit number table 48, the searching unit 43 is able to calculate the number of successive ON bits at a high speed. Further, the loop process itself is eliminated from the flowchart illustrated in FIG. 21, in order to reduce the condition judging processes with a loop counter that are commonly used.

As explained above, according to the second embodiment, on the basis of the free state of each of the computation nodes, the searching unit 43 creates the successive free node information, for each of the numbers indicating the successive free nodes in the Z direction and the Y direction and for each of the sets of X-Y-Z coordinates by using the hierarchical data structure illustrated in FIGS. 10A to 10D. The searching unit 43 further writes the created successive free node information into the hierarchical data storage unit 41. After that, the searching unit 43 calculates the number of successive free nodes in the X direction and the three-dimensional number of successive free nodes for each of the numbers indicating the successive free nodes in the Z direction and the Y direction and for each of the sets of X-Y-Z coordinates, by using the data that has the hierarchical data structure and has been written in the hierarchical data storage unit 41. Accordingly, the searching unit 43 is able to reduce the number of times the condition judging process is performed during the process of searching for the rectangular parallelepipeds containing free nodes. The searching unit 43 is thus able to shorten the time period required by the searching process.

Further, according to the second embodiment, when searching for the number of successive free nodes in the X direction by using the data that has the hierarchical data structure and has been written in the hierarchical data storage unit 41, the searching unit 43 calculates the number of successive ON bits by using the bit number table 48. Accordingly, the searching unit 43 is able to further shorten the processing time period required by the process of searching for the rectangular parallelepipeds containing free nodes.

In the second embodiment, the example in which the search is conducted by crossing the X-axis is explained. However, the present disclosure is not limited to this example. The present disclosure is similarly applicable to a situation where a search is conducted by crossing the Y-axis and/or the Z-axis. Further, the present disclosure is also similarly applicable to a situation where a search is conducted by crossing the axes in the three directions of the X-, Y-, and Z-axes and to a situation where a search is conducted without crossing any of the axes in the directions of the X-, Y-, and Z-axes.

Further, in the second embodiment, the example in which the computation nodes are arranged three-dimensionally is explained. However, the present disclosure is not limited to this example. The present disclosure is similarly applicable to situations where the computation nodes are arranged in arbitrary dimensionality other than the three dimensions such as, for example, a situation where the computation nodes are arranged two-dimensionally.

In the first and the second embodiments, the management apparatus is explained. By realizing the configurations of the management apparatus with the use of software, it is possible to obtain a management computer program (hereinafter, "management program") that has the same functions. Next, a computer that executes the management program will be explained.

Figure 22:
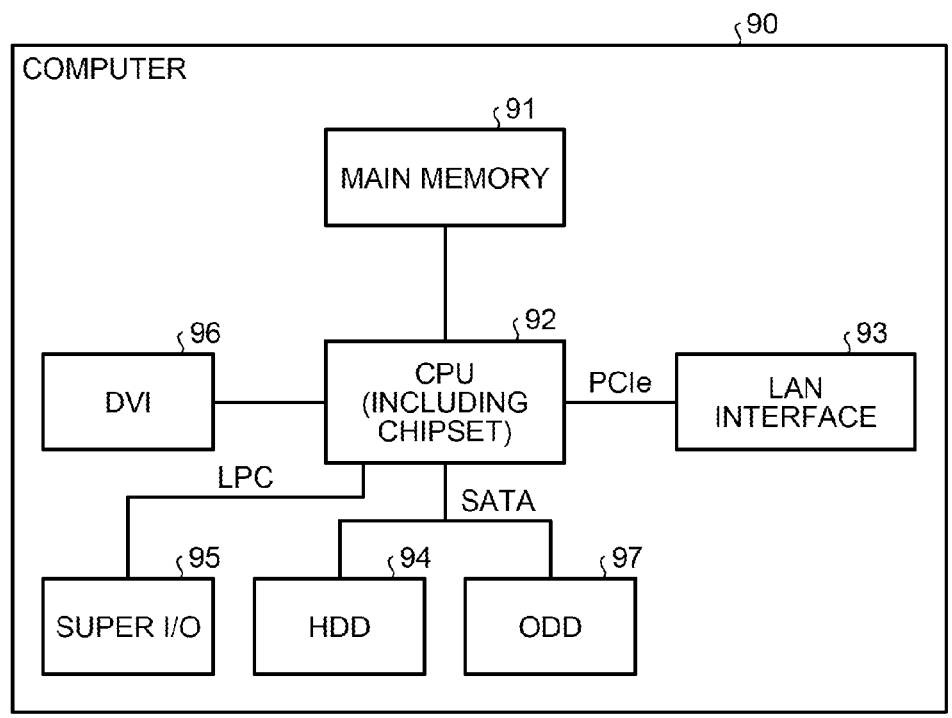
FIG. 22 is a diagram of a hardware configuration of a computer that executes a management program according to an embodiment.
Figure 23A:
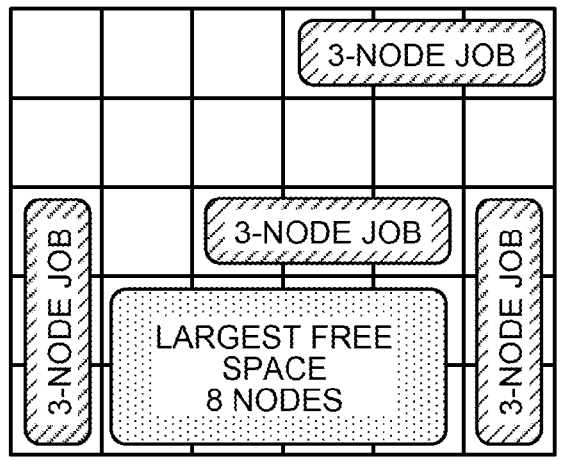
FIG. 23A is a drawing of a situation where many fragments have occurred.
Figure 23B:
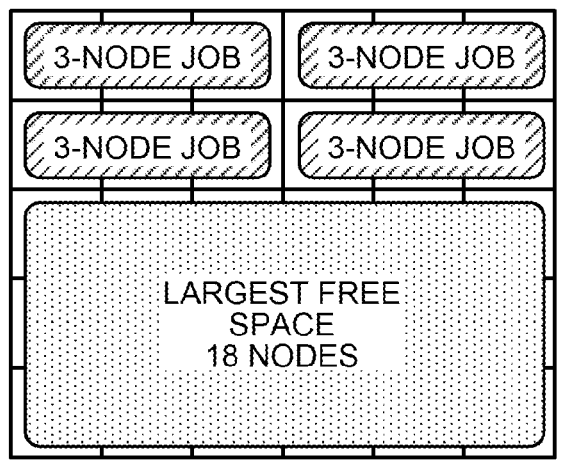
FIG. 23B is a drawing of a situation where computation nodes are selected in such a manner that a large free space remains.
Figure 23C:
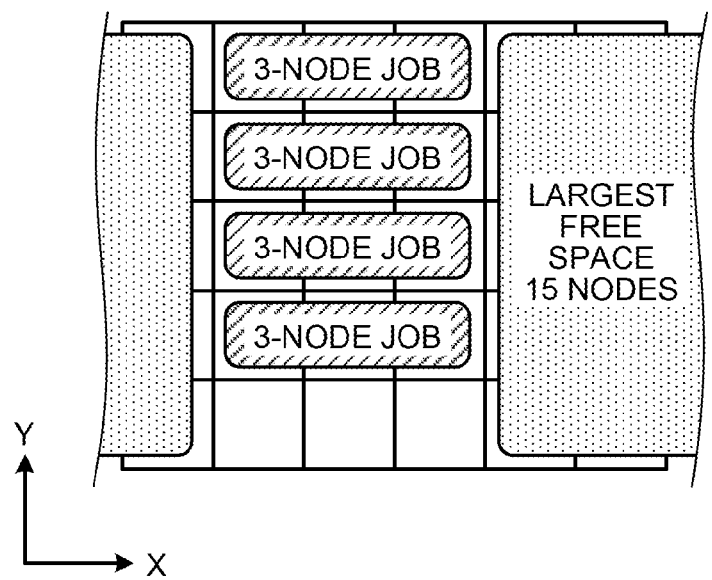
FIG. 23C is a drawing of an example of a largest free space positioned across the X-axis in a two-dimensional torus connection.
Figure 25A:
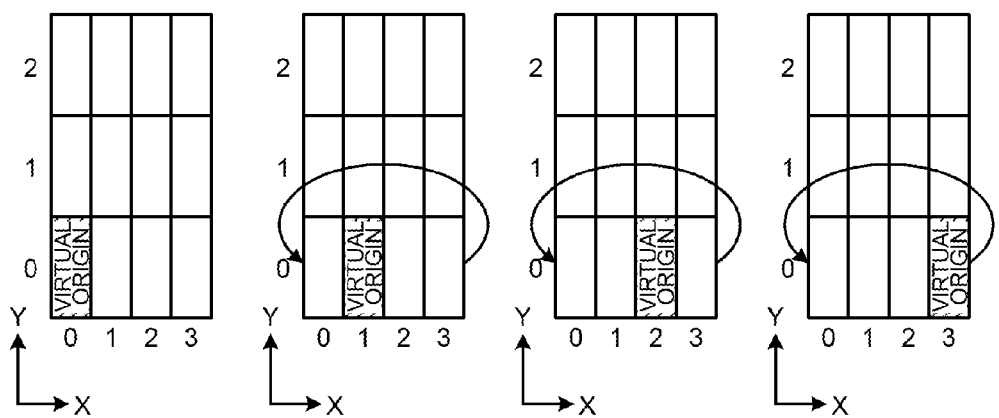
FIG. 25A is a drawing for explaining shifting of a virtual origin in an X-axis crossing process.
Figure 25B:
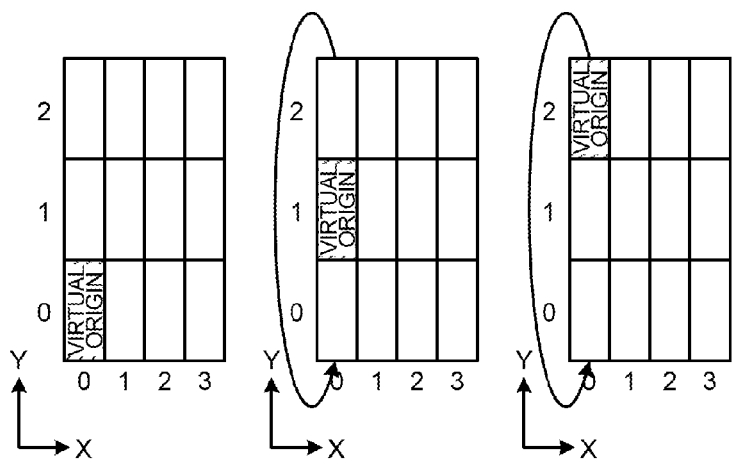
FIG. 25B is a drawing for explaining shifting of a virtual origin in a Y-axis crossing process.
Figure 26:
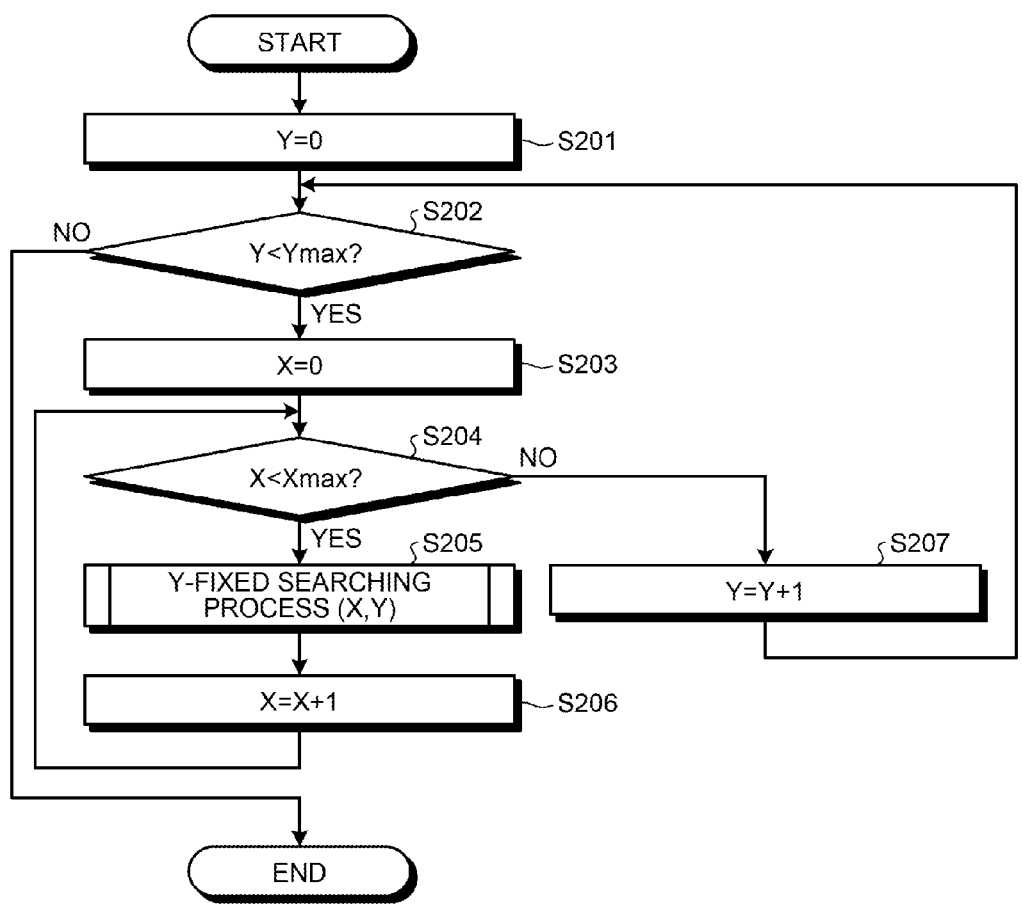
FIG. 26 is a flowchart of a flow in a rectangle searching process for two-dimensional successive free computation nodes.
Figure 27:
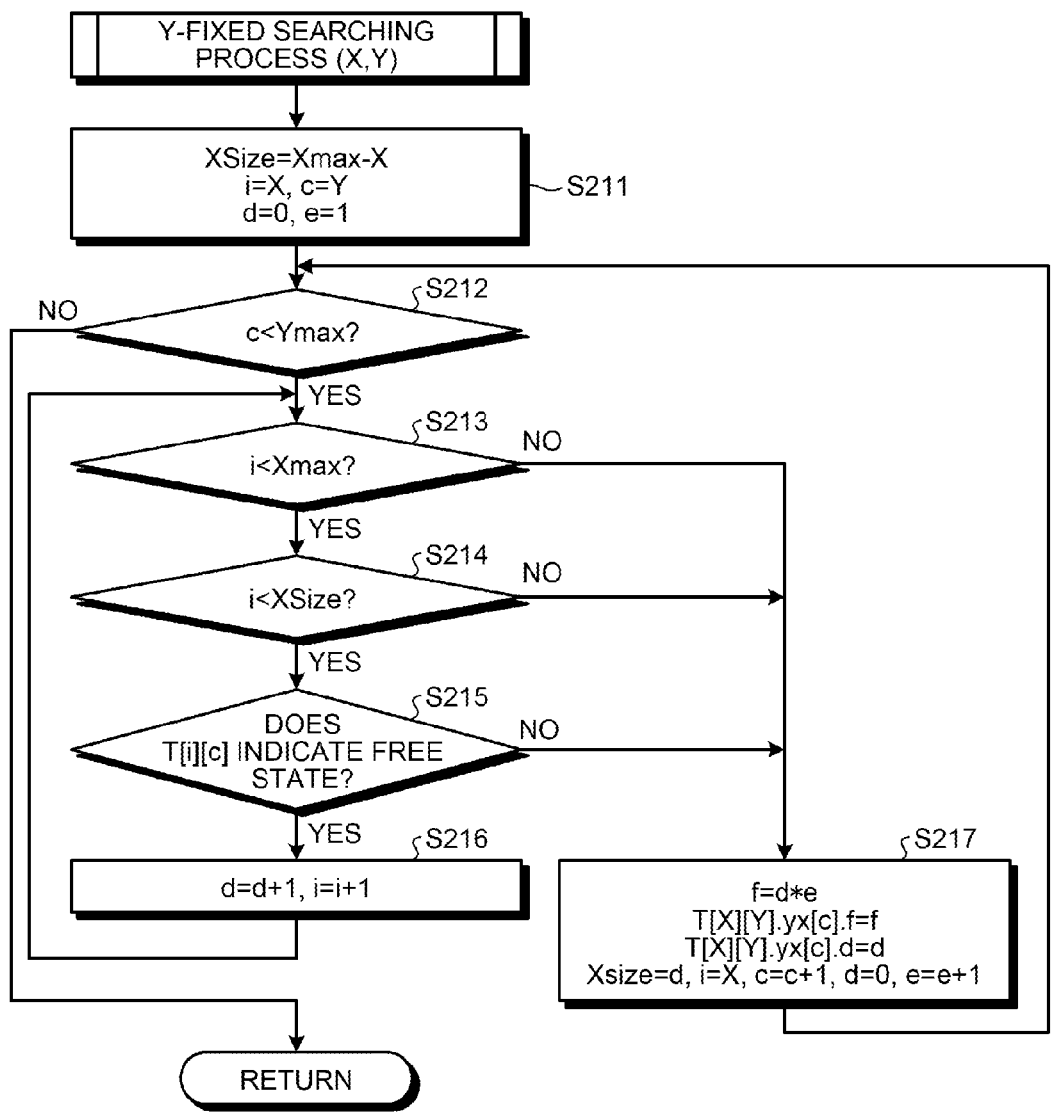
FIG. 27 is a flowchart of a flow in a Y-fixed searching process (X,Y)
Figure 28:
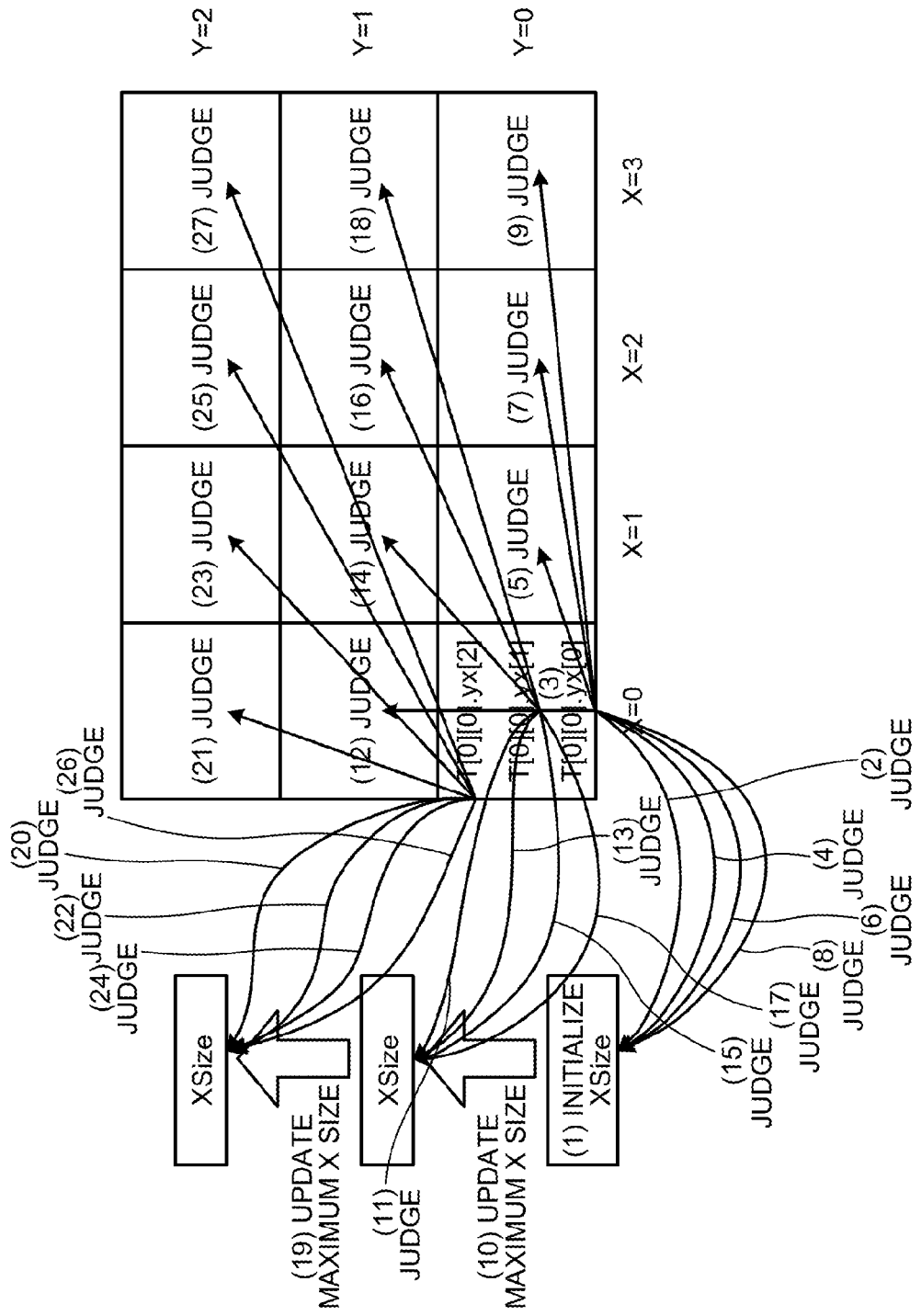
FIG. 28 is a drawing for explaining an outline of a process in a Y-fixed searching process (0,0)
Figure 30:
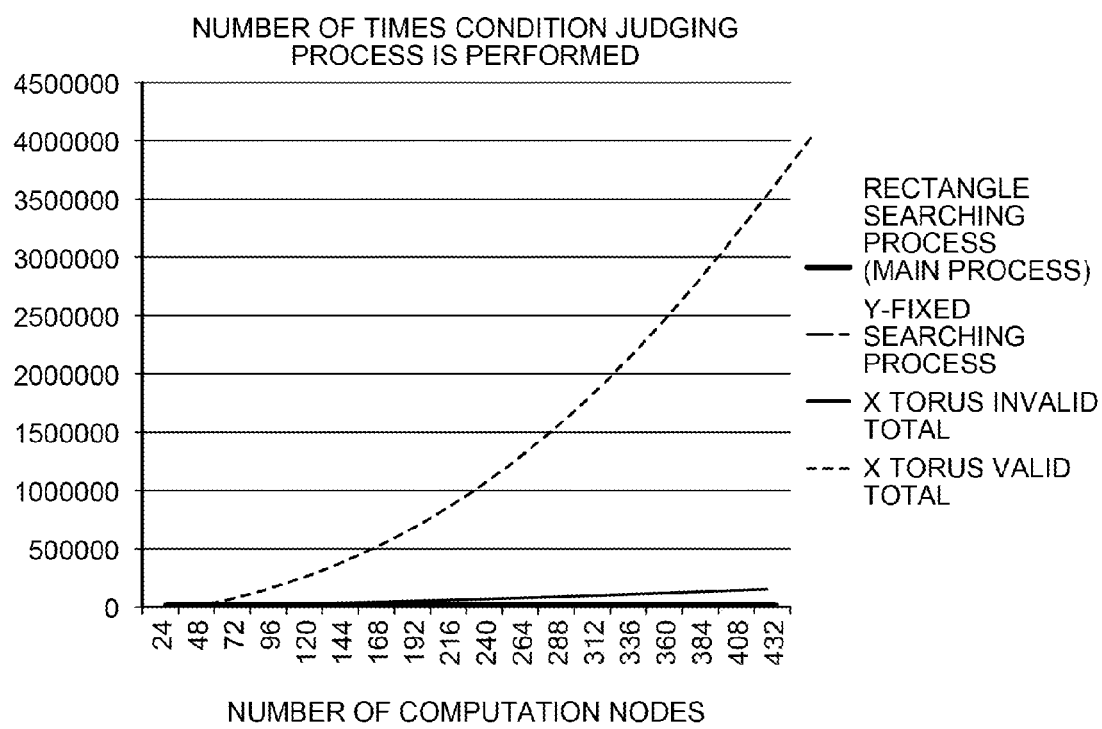
FIG. 30 is another drawing for explaining the increase in the number of times the condition judging process is performed, the increase being caused by the increase in the number of computation nodes.

FIG. 22 is a diagram of a hardware configuration of the computer that executes the management program according to any of the exemplary embodiment. As illustrated in FIG. 22, a computer 90 includes a main memory 91, a Central Processing Unit (CPU) 92, a Local Area Network (LAN) interface 93, and a Hard Disk Drive (HDD) 94. Further, the computer 90 includes a super Input/Output (I/O) 95, a Digital Visual Interface (DVI) 96, and an Optical Disk Drive (ODD) 97.

The main memory 91 is a memory configured to store therein computer programs (hereinafter, "programs"), results from the execution of programs in progress, and the like. The CPU 92 is a central processing unit configured to read any of the programs from the main memory 91 and to execute the read program. The CPU 92 includes a chipset that has a memory controller.

The LAN interface 93 is an interface configured to connect the computer 90 to another computer via a LAN. The HDD 94 is a disk device configured to store therein programs and data. The super I/O 95 is an interface used for connecting an input device such as a mouse or a keyboard. The DVI 96 is an interface used for connecting a liquid crystal display device. The ODD 97 is a device configured to write and read data to and from a Digital Versatile Disk (DVD).

The LAN interface 93 is connected to the CPU 92 by Peripheral Component Interconnect (PCI) Express. The HDD 94 and the ODD 97 are connected to the CPU 92 by Serial Advanced Technology Attachment (SATA). The super I/O 95 is connected to the CPU 92 by Low Pin Count (LPC).

The management program to be executed by the computer 90 is stored in a DVD, is read from the DVD by the ODD 97, and is installed into the computer 90. Alternatively, the management program may be stored in a database or the like in another computer system connected via the LAN interface 93 and may be read from the database so as to be installed into the computer 90. After that, the installed management program is stored in the HDD 94, is read into the main memory 91, and is executed by the CPU 92.

According to an aspect of an embodiment, it is possible to shorten the time period required by the process of searching for the successive free computation nodes.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system comprising: a parallel computer including a predetermined number of information processing apparatuses that are connected together in a toric form via connection ends in a direction of a predetermined axis; and a management apparatus that manages the parallel computer, wherein the management apparatus includes:
a search data storage unit that stores therein, for each of the information processing apparatuses used as a starting point, search data about a successive-free-apparatus number indicating how many information processing apparatuses are found in a search to be successively in a free state with respect to each of directions of all axes from the starting-point information processing apparatus, the search being conducted in twice as many information processing apparatuses as the predetermined number by crossing the connection ends positioned in the direction of the predetermined axis;
a searching unit that, by using the search data stored in the search data storage unit, searches for the successive-free-apparatus number while including situations where the connection ends are crossed in the direction of the predetermined axis; and
an allocating unit that allocates two or more of the information processing apparatuses to an allocation target job, on a basis of the successive-free-apparatus number found in the search by the searching unit.

2. The parallel computer system according to claim 1, wherein the searching unit searches for the successive-free-apparatus number that uses one of the information processing apparatus as the starting point, by repeatedly performing a process of searching for how many information processing apparatuses are successively in a free state in the direction of the axis with respect to a fixed value indicating how many information processing apparatuses are successively in the free state in a direction of another one of the axes, while changing the fixed value.

3. The parallel computer system according to claim 2, wherein the searching unit performs the process of searching for how many information processing apparatuses are successively in the free state in the direction of the axis with respect to the fixed value, by judging a usage state of each of the information processing apparatus, one by one, in an increasing direction of the axis from the starting point until an information processing apparatus that is in use is found.

4. A method for controlling a parallel computer system comprising a parallel computer that includes a predetermined number of information processing apparatuses that are connected together in a toric form via connection ends in a direction of a predetermined axis; and a management apparatus that manages the parallel computer and that includes a search data storage unit that stores therein, for each of the information processing apparatuses used as a starting point, search data about a successive-free-apparatus number indicating how many information processing apparatuses are found in a search to be successively in a free state with respect to each of directions of all axes from the starting-point information processing apparatus, the search being conducted in twice as many information processing apparatuses as the predetermined number by crossing the connection ends positioned in the direction of the predetermined axis, the parallel computer system controlling method comprising:

searching performed by a searching unit included in the management apparatus to search for the successive-free-apparatus number while including situations where the connection ends are crossed in the direction of the predetermined axis, by using the search data stored in the search data storage unit; and allocating performed by an allocating unit included in the management apparatus to allocate two or more of the information processing apparatuses to an allocation target job, on a basis of the successive-free-apparatus number found in the search by the searching unit.

5. A non-transitory computer-readable storage medium storing a controlling computer program for a management apparatus that manages a parallel computer that includes a predetermined number of information processing apparatuses that are connected together in a toric form via connection ends in a direction of a predetermined axis, the management apparatus including a search data storage unit that stores therein, for each of the information processing apparatuses used as a starting point, search data about a successive-free-apparatus number indicating how many information processing apparatuses are found in a search to be successively in a free state with respect to each of directions of all axes from the starting-point information processing apparatus, the search being conducted in twice as many information processing apparatuses as the predetermined number by crossing the connection ends positioned in the direction of the predetermined axis, the controlling computer program comprising:

causing a searching unit included in the management apparatus to search for the successive-free-apparatus number while including situations where the connection ends are crossed in the direction of the predetermined axis, by using the search data stored in the search data storage unit; and causing an allocating unit included in the management apparatus to allocate two or more of the information processing apparatuses to an allocation target job, on a basis of the successive-free-apparatus number found in the search by the searching unit.

\* \* \* \* \*